United States Patent
Byron et al.

(10) Patent No.: US 9,830,314 B2
(45) Date of Patent: Nov. 28, 2017

(54) ERROR CORRECTION IN TABLES USING A QUESTION AND ANSWER SYSTEM

(71) Applicant: International Business Machines Corporation, Armonk, NY (US)

(72) Inventors: Donna K. Byron, Petersham, MA (US); Alexander Pikovsky, Lexington, MA (US); Abhishek Shivkumar, Bangalore (IN); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 14/082,862

(22) Filed: Nov. 18, 2013

(65) Prior Publication Data
US 2015/0142418 A1 May 21, 2015

(51) Int. Cl.
G06F 17/28 (2006.01)
G06F 17/27 (2006.01)
G06F 17/24 (2006.01)

(52) U.S. Cl.
CPC ........ G06F 17/2785 (2013.01); G06F 17/245 (2013.01); G06F 17/273 (2013.01); G06F 17/28 (2013.01)

(58) Field of Classification Search
CPC ........ G06F 17/20; G06F 17/21; G06F 17/245; G06F 17/243; G06F 17/247; G06F 17/273; G06F 17/2735; G06F 17/2785; G06F 17/2881
USPC .................................................. 704/7, 9, 251
See application file for complete search history.

(56) References Cited

U.S. PATENT DOCUMENTS

| 4,688,195 A | 8/1987 | Thompson et al. |
| 5,491,700 A | 2/1996 | Wright et al. |
| 6,128,297 A * | 10/2000 | Reumerman ....... H04L 12/5601 370/391 |

(Continued)

FOREIGN PATENT DOCUMENTS

| JP | 05334490 | 12/1993 |
| JP | 2010134709 A | 6/2010 |

(Continued)

OTHER PUBLICATIONS

U.S. Appl. No. 14/492,172.

(Continued)

*Primary Examiner* — Richemond Dorvil
*Assistant Examiner* — Rodrigo Chavez
(74) *Attorney, Agent, or Firm* — Francis Lammes; Stephen J. Walder, Jr.; Reza Sarbakhsh

(57) ABSTRACT

Mechanisms are provided for performing tabular data correction in a document. The mechanisms receive a natural language document comprising a portion of content and analyze the portion of content within the natural language document to identify an erroneous sub-portion comprising an erroneous or missing item of information. The mechanisms generate a semantic signature for the erroneous sub-portion and generate a query based on the semantic signature. The mechanisms apply the query to a knowledge base to identify a candidate sub-portion of content. The mechanisms correct the erroneous sub-portion using the identified candidate sub-portion of content to generate a corrected natural language document.

14 Claims, 11 Drawing Sheets

(56) References Cited

U.S. PATENT DOCUMENTS

| | | | |
|---|---|---|---|
| 6,161,103 | A | 12/2000 | Rauer et al. |
| 6,904,428 | B2 | 6/2005 | Frieder et al. |
| 7,412,510 | B2 | 8/2008 | Schweitzer et al. |
| 7,620,665 | B1 | 11/2009 | George et al. |
| 7,631,065 | B2 | 12/2009 | Schweitzer et al. |
| 7,774,193 | B2 * | 8/2010 | Gao ............... G06F 17/273 704/10 |
| 7,792,823 | B2 | 9/2010 | Cain et al. |
| 7,792,829 | B2 | 9/2010 | Brill et al. |
| 8,037,108 | B1 | 10/2011 | Chang |
| 8,055,661 | B2 | 11/2011 | Lee et al. |
| 8,255,789 | B2 | 8/2012 | Berger et al. |
| 8,364,673 | B2 | 1/2013 | Chang et al. |
| 8,442,988 | B2 | 5/2013 | Draese et al. |
| 8,719,014 | B2 | 5/2014 | Wagner |
| 8,781,989 | B2 | 7/2014 | Duchon |
| 8,910,018 | B2 | 12/2014 | Huang et al. |
| 9,262,397 | B2 * | 2/2016 | Gamon ............ G06F 17/274 |
| 2002/0078406 | A1 | 6/2002 | Kondoh et al. |
| 2003/0061030 | A1 | 3/2003 | Kuboyama et al. |
| 2003/0097384 | A1 | 5/2003 | Hu et al. |
| 2004/0030687 | A1 | 2/2004 | Hidaka et al. |
| 2004/0103367 | A1 | 5/2004 | Riss et al. |
| 2004/0117739 | A1 | 6/2004 | Challenger et al. |
| 2006/0173834 | A1 | 8/2006 | Brill et al. |
| 2007/0011183 | A1 | 1/2007 | Langseth et al. |
| 2008/0027888 | A1 | 1/2008 | Azzam et al. |
| 2008/0208882 | A1 | 8/2008 | Zhang et al. |
| 2009/0171999 | A1 | 7/2009 | McColl et al. |
| 2009/0287678 | A1 | 11/2009 | Brown et al. |
| 2009/0313205 | A1 | 12/2009 | Hino et al. |
| 2010/0050074 | A1 | 2/2010 | Nachmani et al. |
| 2010/0146450 | A1 * | 6/2010 | Harada ............ G06F 17/30126 715/838 |
| 2010/0280989 | A1 | 11/2010 | Mehra et al. |
| 2010/0281455 | A1 | 11/2010 | Anand et al. |
| 2011/0022550 | A1 | 1/2011 | Pennacchiotti et al. |
| 2011/0055172 | A1 * | 3/2011 | Tan ............... G06F 17/30241 707/692 |
| 2011/0060584 | A1 | 3/2011 | Ferrucci et al. |
| 2011/0066587 | A1 | 3/2011 | Ferrucci et al. |
| 2011/0125734 | A1 | 5/2011 | Duboue et al. |
| 2011/0126275 | A1 | 5/2011 | Anderson et al. |
| 2011/0161070 | A1 * | 6/2011 | Chen ............... G06F 17/2785 704/9 |
| 2011/0320419 | A1 | 12/2011 | Johnston et al. |
| 2012/0004905 | A1 | 1/2012 | Bobick et al. |
| 2012/0011115 | A1 | 1/2012 | Madhavan et al. |
| 2012/0191716 | A1 | 7/2012 | Omoigui |
| 2012/0251985 | A1 * | 10/2012 | Steels ............... G09B 19/06 434/156 |
| 2012/0303661 | A1 | 11/2012 | Blohm et al. |
| 2013/0007055 | A1 | 1/2013 | Brown et al. |
| 2013/0018652 | A1 | 1/2013 | Ferrucci et al. |
| 2013/0060774 | A1 | 3/2013 | Shepherd et al. |
| 2013/0066886 | A1 | 3/2013 | Bagchi et al. |
| 2013/0290822 | A1 | 10/2013 | Chen |
| 2013/0325442 | A1 * | 12/2013 | Dahlmeier ......... G06F 17/276 704/9 |
| 2014/0046696 | A1 | 2/2014 | Higgins et al. |
| 2014/0115012 | A1 * | 4/2014 | Das ............... G06F 17/30292 707/803 |
| 2014/0122535 | A1 | 5/2014 | Gerard et al. |
| 2014/0278358 | A1 | 9/2014 | Byron et al. |
| 2014/0325331 | A1 | 10/2014 | Madireddi et al. |
| 2015/0066895 | A1 | 3/2015 | Komissarchik et al. |

FOREIGN PATENT DOCUMENTS

| | | |
|---|---|---|
| JP | 2011529594 A | 12/2011 |
| WO | WO 03/012661 A1 | 3/2003 |

OTHER PUBLICATIONS

U.S. Appl. No. 14/834,810.
"Apache PDFBox—A Java PDF Library". https://pdfbox.apache.org/, Accessed online Jun. 10, 2015, 2 pages.
"IBM SPSS Statistics", http://www-01.ibm.com/software/analytics/spss/products/statistics/, Accessed online Jun. 10, 2015, 2 pages.
"Microsoft Office", http://office.microsoft.com/en-us/, Accessed online Aug. 21, 2015, 5 pages.
"Natural Language Processing", Wikipedia, http://en.wikipedia.org/wiki/Natural_language_processing, Accessed online Jun. 10, 2015, 12 pages.
"ODFDOM—The Opendocument API", http://incubator.apache.org/odftoolkit/odfdom/index.html, Accessed online Jun. 10, 2015, 2 pages.
"Oracle Outside in Technology", http://www.oracle.com/us/technologies/embedded/025613.htm, Accessed online Jun. 10, 2015, 2 pages.
"SPSS Text Analytics for Surveys", http://www-01.ibm.com/software/analytics/spss/products/statistics/text-analytics-for-surveys/, Accessed online Jun. 10, 2015, 2 pages.
Bhagavatula, Chandra S., "Learning Semantics of WikiTables", Doctoral Thesis Proposal, Department of Electrical Engineering and Computer Science, Northwestern University, Dec. 9, 2013, 22 pages.
Li, Xiang et al., "Towards Fine-grained Citation Function Classification", Proceedings of Recent Advances in Natural Language Processing, Hissar, Bulgaria, Sep. 7-13, 2013, pp. 402-407.
McCord, M.C. et al., "Deep parsing in Watson", IBM J. Res. & Dev. vol. 56 No. 3/4 Paper 3, May/Jul. 2012, pp. 3:1-3:15.
Oliver, Andrew C. et al., "Apache POI—the Java API for Microsoft Documents", Project News, http://poi.apache.org, May 11, 2015, 2 pages.
Syed, Zareen et al., "Exploiting a Web of Semantic Data for Interpreting Tables", Second Web Science Conference, Apr. 26-27, 2010, http://journal.webscience.org/322/2/websci10_submission_108.pdf, 8 pages.
International Preliminary Report on Patentability dated Jun. 2, 2016 for International Application No. PCT/JP2014/005143, 8 pages.
Ishida, Kenji et al., "Answer narrowing-down technology in QA task using WWW (World Wide Web)", English Translation, Proceedings of the Eleventh Annual Meeting of The Association for Natural Language Processing, Mar. 15, 2005, 10 pages.
Byron, et al., "Discovering Relationships in Tabular Data", filed Nov. 26, 2013, U.S. Appl. No. 14/090,184.
Byron, et al., "Subject-Matter Analysis of Tabular Data", filed Nov. 26, 2013, U.S. Appl. No. 14/090,230.
Byron, et al., "Adapting Tabular Data for Narration", filed Mar. 15, 2013, U.S. Appl. No. 13/838,130.
Byron, et al., "Discovering Relationships in Tabular Data", filed Jul. 1, 2013, U.S. Appl. No. 13/932,435.
Byron, et al, "Subject-Matter Analysis of Tabular Data", filed Jul. 18, 2013, U.S. Appl. No. 13/945,259.
U.S. Appl. No. 13/664,144.
U.S. Appl. No. 13/925,015.
"About Semantic Table", Semantic Table.org, Bioinformatics and Systems Engineering (BASE) division, RIKEN, http://semantictable.org, accessed on Oct. 25, 2012, 1 page.
"Gleaning Resource Descriptions from Dialects of Languages (GRDDL)", W3C Recommendation, W3C, http://www.w3.org/TR/grddl, Sep. 11, 2007, 17 pages.
"SPARQLMotion Getting Started Guide", TopQuadrant, Inc., http://www.topquadrant.com/products/SPARQLMotion_docs/SPARQLMotion_guide.html, accessed on Oct. 25, 2012, 6 pages.
Golbeck, Jennifer et al., "New Tools for the Semantic Web", Knowledge Engineering and Knowledge Management: Ontologies and the Semantic Web, Lecture Notes in Computer Science, DOI: 10.1007/3-540-45810-7_35, vol. 2473/2002, 2002, 11 pages.
High, Rob, "The Era of Cognitive Systems: An Inside Look at IBM Watson and How it Works", IBM Corporation, http://ip.com/pdf/redbook/REDP495500.pdf, 2012, 16 pages.
IBM, "Dynamic Model-Extracting Table Widget", ip.com, IPCOM000010243D, Nov. 11, 2002, 7 pages.

(56) References Cited

OTHER PUBLICATIONS

Langegger, Andreas et al., "XLWrap—Querying and Integrating Arbitrary Spreadsheets with SPARQL", Proceedings of the 8th International Semantic Web Conference, 2009, Springer-Verlag Berlin, Heidelberg, ISBN: 978-3-642-04929-3, 2009, 16 pages.

Pinto, David, "Table Extraction Using Conditional Random Fields", http://scholarworks.umass.edu/cs_faculty_pubs/76, 2003, Computer Science Department Faculty Publication Series, Paper 76, 9 pages.

Piris, Ruben N., "Extracting Knowledge Bases from Table-Structured Web Resources Applied to the Semantic Based Requirements Engineering Methodology SoftWiki", http://subs.emis.de/LNI/Proceedings/Proceedings176/1008.pdf, 2010, pp. 992-995.

Pivk, Aleksander et al., "From Tables to Frames", http://people.aifb.kit.edu/pci/FromTablesToFramesTech.pdf, Jul. 19, 2004, 1-17.

Tao, Cui et al., "Automatic Hidden-Web Table Interpretation, Conceptualization, and Semantic Annotation", Department of Computer Science, Brigham Young University, Provo, UT 84602, USA, 2009, pp. 1-21.

Yuan, Michael J., "Watson and healthcare, How natural language processing and semantic search could revolutionize clinical decision support", IBM developerWorks, IBM Corporation, Apr. 12, 2011, 14 pages.

\* cited by examiner

302 — FISCAL YEAR ENDED JANUARY 31  304
352 — CHANGE  354

(DOLLARS IN THOUSANDS)

| | 2009 306 | 2008 308 | 2007 310 | 2009 vs 2008 356 | | 2008 vs 2007 358 | |
|---|---|---|---|---|---|---|---|
| REVENUES AND NONOPERATING INCOME 312 | | | | | | | |
| 316 { ELECTRIC | $1,899,457 | $1,605,238 | $1,515,746 | $294,219 | 18.3% | $89,492 | 5.9% |
| 318 — GAS | 251,884 | 255,439 | 254,340 | (3,555) | -1.4% | 1,099 | 0.4% |
| 314 — TOTAL OPERATING REVENUES | 2,151,341 | 1,860,677 | 1,770,086 | 290,644 | 15.6% | 90,591 | 5.1% |
| 322 — NONOPERATING INCOME, NET | 72,008 | 116,956 | 95,987 | (44,948) | -38.4% | 20,969 | 21.8% |
| 320 — TOTAL REVENUES AND NONOPERATING INCOME | 2,223,349 | 1,977,633 | 1,866,073 | 245,716 | 12.4% | 111,560 | 6.0% |
| EXPENSES | | | | | | | |
| OPERATING EXPENSES | | | | | | | |
| FUEL, PURCHASED POWER AND DISTRIBUTION GAS | 899,314 | 701,190 | 659,839 | 198,124 | 28.3% | 41,351 | 6.3% |
| STP OPERATION AND MAINTENANCE | 139,073 | 121,754 | 115,269 | 17,319 | 14.2% | 6,485 | 5.6% |
| CPS ENERGY OPERATION AND MAINTENANCE | 323,874 | 311,437 | 277,619 | 12,437 | 4.0% | 33,818 | 12.2% |
| ANNUAL OPEB COST | 13,054 | 13,377 | 16,145 | (323) | -2.4% | (2,868) | -17.1% |
| REGULATORY ASSESSMENTS | 31,257 | 23,192 | 28,645 | 8,065 | 34.8% | (5,453) | -19.0% |
| DECOMMISSIONING | 21,201 | 25,608 | 25,387 | (4,407) | -17.2% | 221 | 0.9% |
| DEPRECIATION, DEPLETION AND AMORTIZATION | 283,398 | 264,657 | 262,375 | 18,741 | 7.1% | 2,282 | 0.9% |
| TOTAL OPERATING EXPENSES | 1,711,171 | 1,461,215 | 1,385,279 | 249,956 | 17.1% | 75,936 | 5.5% |

FIG. 4A 400

412 REVENUES AND NONOPERATING INCOME

| | FISCAL YEAR ENDED JANUARY 31 402 | | | CHANGE 454 (DOLLARS IN THOUSANDS) 452 | | | |
|---|---|---|---|---|---|---|---|
| | 2009 406 | 2008 408 | 2007 410 404 | 2009 vs 2008 456 | | 2008 vs 2007 458 | |
| 416 ELECTRIC | $1,899,457 | $1,605,238 | $1,515,746 | $294,219 | 18.3% | $89,492 | 5.9% |
| 418 GAS | 251,884 | 255,439 | 254,340 | (3,555) | -1.4% | 1,099 | 0.4% |
| 414 TOTAL OPERATING REVENUES 428 | 2,151,341 | 1,860,677 | 1,770,086 | 290,644 | 15.6% | 90,591 | 5.1% |
| 422 NONOPERATING INCOME, NET | 72,008 | 116,956 | 95,987 | (44,948) | -38.4% | 20,969 | 21.8% |
| 420 TOTAL REVENUES AND NONOPERATING INCOME 430 | 2,223,349 | 1,977,633 | 1,866,073 | 245,716 | 12.4% | 111,560 | 6.0% |
| EXPENSES 426 | | | | | | | |
| OPERATING EXPENSES | | | | | | | |
| FUEL, PURCHASED POWER AND DISTRIBUTION GAS | 899,314 | 701,190 | 659,839 | 198,124 | 28.3% | 41,351 | 6.3% |
| STP OPERATION AND MAINTENANCE | 139,073 | 121,754 | 115,269 | 17,319 | 14.2% | 6,485 | 5.6% |
| CPS ENERGY OPERATION AND MAINTENANCE | 323,874 | 311,437 | 277,619 | 12,437 | 4.0% | 33,818 | 12.2% |
| ANNUAL OPEB COST | 13,054 | 13,377 | 16,145 | (323) | -2.4% | - | - |
| REGULATORY ASSESSMENTS | 31,257 | 23,192 | 28,645 | 8,065 | 34.8% | (5,453) | -17.1% |
| DECOMMISSIONING | 21,201 | 25,608 | 25,387 | (4,407) | -17.2% | 221 | 0.9% |
| DEPRECIATION, DEPLETION AND AMORTIZATION | 283,398 | 264,657 | 262,375 | 18,741 | 7.1% | 2,282 | 0.9% |
| TOTAL OPERATING EXPENSES | 1,711,171 | 1,461,215 | 1,385,279 | 249,956 | 17.1% | 75,936 | 5.5% |

424 (bracket covering 2009, 2008, 2007 headers)

SUMMARY OF REVENUES,
EXPENSES AND CHANGES (DOLLARS IN THOUSANDS)

| | FISCAL YEAR ENDED JANUARY 31 | | |
|---|---|---|---|
| | 2009 | 2008 | 2007 |
| [1] REVENUES AND NONOPERATING INCOME | | | |
| [2] ELECTRIC | $1,899,457 | $1,605,238 | $1,515,746 |
| [3] GAS | 251,884 | 255,439 | rei/xz |
| [4] TOTAL OPERATING REVENUES | 2,151,341 | 1,860,677 | 1,770,086 |
| [5] NONOPERATING INCOME, NET | 72,008 | 116,956 | 95,987 |
| [6] TOTAL REVENUES AND NONOPERATING INCOME | 2,223,349 | 1,977,633 | 1,866,073 |
| EXPENSES | | | |
| OPERATING EXPENSES | | | |
| FUEL, PURCHASED POWER AND DISTRIBUTION GAS | 899,314 | 701,190 | 659,839 |
| STP OPERATION AND MAINTENANCE | 139,073 | 121,754 | 115,269 |
| CPS ENERGY OPERATION AND MAINTENANCE | 323,874 | 311,437 | 277,619 |
| ANNUAL OPEB COST | 13,054 | 13,377 | 16,145 |
| REGULATORY ASSESSMENTS | 31,257 | 23,192 | 28,645 |
| DECOMMISSIONING | 21,201 | 25,608 | 25,387 |
| DEPRECIATION, DEPLETION AND AMORTIZATION | 283,398 | 264,657 | 262,375 |
| TOTAL OPERATING EXPENSES | 1,711,171 | 1,461,215 | 1,385,279 |

SUMMARY OF REVENUES,
EXPENSES AND CHANGES (DOLLARS IN THOUSANDS)

| | FISCAL YEAR ENDED JANUARY 31 | |
|---|---|---|
| | <u>2006</u> | <u>2007</u> |
| [1] REVENUES AND NONOPERATING INCOME | | |
| [2] ELECTRIC | $1,899,457 | $1,515,746 |
| [3] GAS | 251,884 | 254,340 |
| [4] TOTAL OPERATING REVENUES | 2,151,341 | 1,770,086 |
| [5] NONOPERATING INCOME, NET | 72,008 | 95,987 |
| [6] TOTAL REVENUES AND NONOPERATING INCOME | 2,223,349 | 1,866,073 |

| EXPENSES | | |
|---|---|---|
| OPERATING EXPENSES | | |
| FUEL, PURCHASED POWER AND DISTRIBUTION GAS | 899,314 | 701,190 |
| STP OPERATION AND MAINTENANCE | 139,073 | 121,754 |
| CPS ENERGY OPERATION AND MAINTENANCE | 323,874 | 311,437 |
| ANNUAL OPEB COST | 13,054 | 13,377 |
| REGULATORY ASSESSMENTS | 31,257 | 23,192 |
| DECOMMISSIONING | 21,201 | 25,608 |
| DEPRECIATION, DEPLETION AND AMORTIZATION | 283,398 | 264,657 |
| TOTAL OPERATING EXPENSES | 1,711,171 | 1,461,215 |

ERROR CORRECTION IN TABLES USING A QUESTION AND ANSWER SYSTEM

BACKGROUND

The present application relates generally to an improved data processing apparatus and method and more specifically to mechanisms for performing error correction in tables using a Question and Answer (QA) system.

Documents include information in many forms. For example, textual information arranged as sentences and paragraphs convey information in a narrative form. However, some types of information are presented in a tabular organization. For example, a document can include tables for presenting financial information, organizational information, and more generally, any data items that are related to one another through some relationship.

Natural language processing (NLP) is a technique that facilitates exchange of information between humans and data processing systems. For example, one branch of NLP pertains to transforming a given content into a human-usable language or form. For example, NLP can accept a document whose content is in a computer-specific language or form, and produce a document whose corresponding content is in a human-readable form.

SUMMARY

In one illustrative embodiment, a method, in a data processing system comprising a processor and a memory, for performing tabular data correction in a document is provided. The method comprises analyzing, by the data processing system, a portion of content within a natural language document to identify an erroneous sub-portion comprising an erroneous or missing item of information. Moreover, the method comprises generating, by the data processing system, a semantic signature for the erroneous sub-portion and generating, by the data processing system, a query based on the semantic signature. In addition, the method comprises applying, by the data processing system, the query to a knowledge base to identify a candidate sub-portion of content. Furthermore, the method comprises correcting, by the data processing system, the erroneous sub-portion using the identified candidate sub-portion of content to generate a corrected natural language document.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 depicts an example of tabular data within which functional dependencies can be identified in accordance with an illustrative embodiment;

FIGS. 4A and 4B depict a block diagram of a manner of discovering relationships in tabular data in accordance with an illustrative embodiment;

FIG. 8A is an example diagram of a table structure that may be found in a document processed by a natural language processing system, in which an erroneous data value is present within the table structure;

FIG. 8B is an example diagram of a table structure that may be found in a document already processed by a natural language processing system and present in a corpus, that may be used as a basis for correcting an erroneous data value in the table structure of FIG. 8 in accordance with one illustrative embodiment;

DETAILED DESCRIPTION

Figure 1:
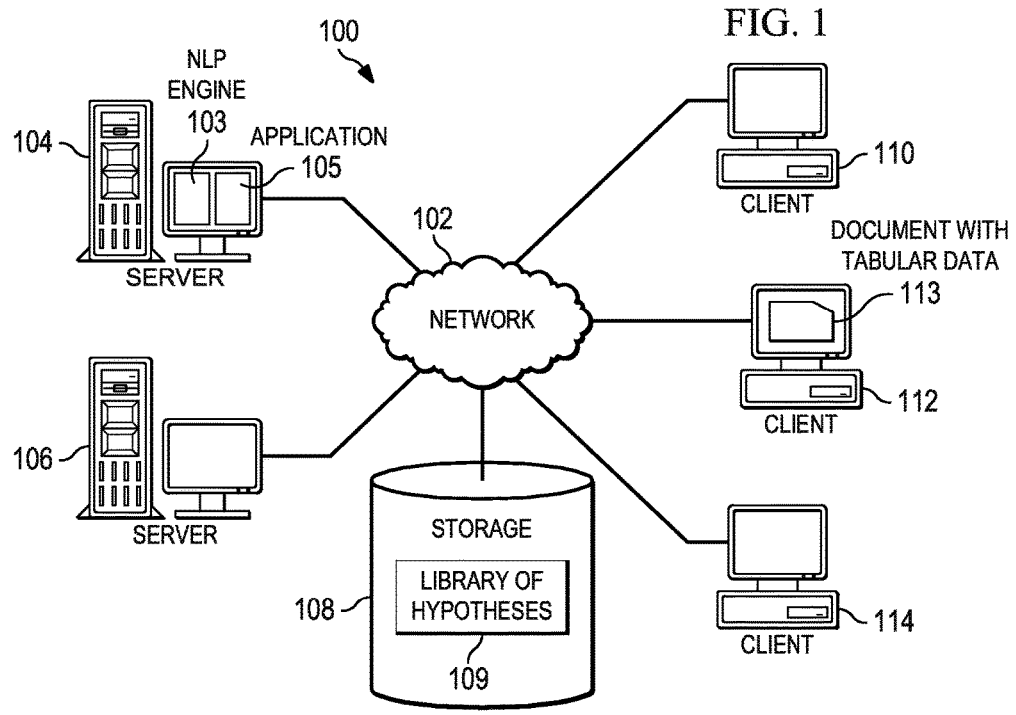
FIG. 1 depicts a pictorial representation of a network of data processing systems in which illustrative embodiments may be implemented.

The illustrative embodiments are directed to correcting erroneous or missing portions of content of a document using a Question and Answer (QA) system and queries generated from the context of the document surrounding the erroneous portion of the content. In some illustrative embodiments, the erroneous or missing portions of content comprise values in cells of table data structures, the context of the document comprises discovered functional dependencies within the table data structures between portions of the table data structures or across one or more different table data structures, and the natural language conversions of cell information into queries are used by a QA system to correct the erroneous or missing portions of content. For purposes of the following discussion, it will be assumed that the illustrative embodiments operated on tables in documents, however it should be appreciated, as noted above, that the mechanisms of the illustrative embodiments may be applied to any portion of content in a document where the portion of content is determined to be likely erroneous or missing and where context information associated with the identified portion of content may be used as a basis for generating one or more queries to be presented to a QA system, as described in greater detail hereafter.

Assuming illustrative embodiments operating on table structures in documents, it should be appreciated that the table data structures may be provided in various formats including as separate table data files or embedded in other data structures, such as documents of a corpus of information, for example. Moreover, various processing operations may be applied to such table data structures by various applications, algorithms, and the like, or may be the impetus for erroneous or missing data values in table data structures. One such processing operation that may be applied is natural language processing (NLP) of a document that contains a table data structure. Another type of operation that is applied to a document which may result in table data structures, or other portions of content, having erroneous or missing data values or content is optical character reading (OCR). Still other types of operations include manual input of table data into an application to generate a table data structure. Any processing operation that may result in, or be applied to, a table data structure may be the focus of the mechanisms of the illustrative embodiments.

For purposes of the following description, it will be assumed that the mechanisms of the illustrative embodiments will be applied to table data structures embedded or otherwise associated with a document in a corpus of information for the purpose of performing natural language processing on the table data structure. However, it should be appreciated that this is only one possible implementation and the mechanisms of the illustrative embodiments are not limited to such. Rather, the scope of the illustrative embodiments of the present invention is intended to encompass any table data structure and any processing operation that may be applied to a corrected table data structure including, but not limited to, table data structures embedded in documents and NLP operations being applied to corrected table data structures.

Using NLP as an example processing operation to be applied to a table data structure, the illustrative embodiments recognize that documents subjected to NLP commonly include tabular data, to wit, content in the form of one or more tabular data structures (tables). A cell of a table is a containing unit within a table, such that the contents of the cell can be uniquely identified by a row and column or other suitable coordinates of the table.

The illustrative embodiments recognize that information presented within the cells of a table often relates to information in other cells of the same table, cells of a different table in the same document, or cells of a different table in a different document. The relationships between the information contained in different cells is important for understanding the meaning of the tabular data, and generally for understanding the meaning of the document as a whole.

The illustrative embodiments recognize that specialized processing or handling is needed in NLP for interpreting the tabular data correctly and completely. Presently available technology for understanding the relationship between cell-values is limited to heuristically guessing a label for a cell using the row or column titles.

Moreover, the illustrative embodiments recognize that tables within electronic documents may contain incorrect or missing information due, for example, to faulty optical character reading (OCR) scan operations, corrupted data, incorrect data entry by human beings, or any other possible source of error. Furthermore, these tables may contain information that is critical for understanding the document in general and thus, it is important to correct the information wherever possible.

The illustrative embodiments used to describe the present invention generally address and solve the above-described problems and other problems related to the limitations of presently available NLP technology with regard to its processing of table information in electronic documents. The illustrative embodiments provide a method, system, and computer program product for discovering relationships in tabular data and for correcting incorrect or missing information in such tabular data based on discovered functional dependencies. Moreover, the illustrative embodiments provide mechanisms for generating queries from the document containing the erroneous or missing content, e.g., data values in cells of a table data structure, and utilizing a Question and Answer (QA) system, such as the Watson™ QA system available from International Business Machines Corporation of Armonk, N.Y., to determine the correct content to replace the erroneous or missing content in the document.

With regard to discovering functional dependencies, the illustrative embodiments recognize that a cell in a table can depend on one or more other cells in the table, cells across different tables in the given document, or cells across different tables in different documents. The dependency of one cell on another is functional in nature, to wit, dependent based on a function. The functions forming the bases of such functional dependencies can be, for example, any combination of mathematical, statistical, logical, or conditional functions that operate on certain cell-values to impart cell-values in certain other cells. As an example, a cell containing a total amount value is functionally dependent upon the cells whose values participate in the total amount value calculation. As another example, a statistical analysis result cell, such as a cell containing a variance value in an experiment, can be functionally dependent on a set of other cells, perhaps in another table, where the outcomes of the various iterations of the experiment are recorded.

These examples are not intended to be limiting on the illustrative embodiments. Functional dependencies are indicative of relationships between the cells of one or more tables, and are highly configurable depending on the data in a table or document, purpose there for, and the meaning of the various cells. Furthermore, a cell can participate in any number of functional dependencies, both as a dependant cell and/or as a depended-on cell. Because information in a cell can relate to information available anywhere in a given document, a functional dependency of a cell can include depending on non-tabular data in a given document as well.

The illustrative embodiments improve the understanding of the information presented in tabular form in a document by enabling an NLP tool to understand relationships of cells of tabular data. The illustrative embodiments provide a way of determining the functional dependencies of cells in a table on other cells, surrounding text of the table, contents in a document, or a combination thereof. Moreover, the illustrative embodiments provide mechanisms for correcting incorrect data in these cells or completing the data in cells where there is missing data based on the detected or discovered functional dependencies. Furthermore, these functional dependencies and other context information extracted from the document, in which the erroneous or missing content is present, may be used to generate queries that can be submitted to a QA system which then applies these queries to a corpus of documents to ascertain the correct content, e.g., data values in an cell of a table, to replace the erroneous or missing content in the document.

Illustrative embodiments described herein improve both precision and recall in natural language processing of a document with tabular data. Typically, attempts to improve precision result in degraded recall performance, and vice versa. The term "precision" refers to a measure of how much of what is understood from a table is correct, over how much is understood from the table. The term "recall" refers to a measure of how much is understood from the table, over how much information there actually is to understand in the table. Through the use of the mechanisms of the illustrative embodiments, both are improved.

The illustrative embodiments are described with respect to certain documents and tabular data only as examples. Such documents, tabular data, or their example attributes are not intended to be limiting to the invention. Furthermore, the illustrative embodiments may be implemented with respect to any type of data, data source, or access to a data source over a data network. Any type of data storage device may provide the data to an illustrative embodiment of the present invention, either locally at a data processing system or over a data network, without departing from the spirit and scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
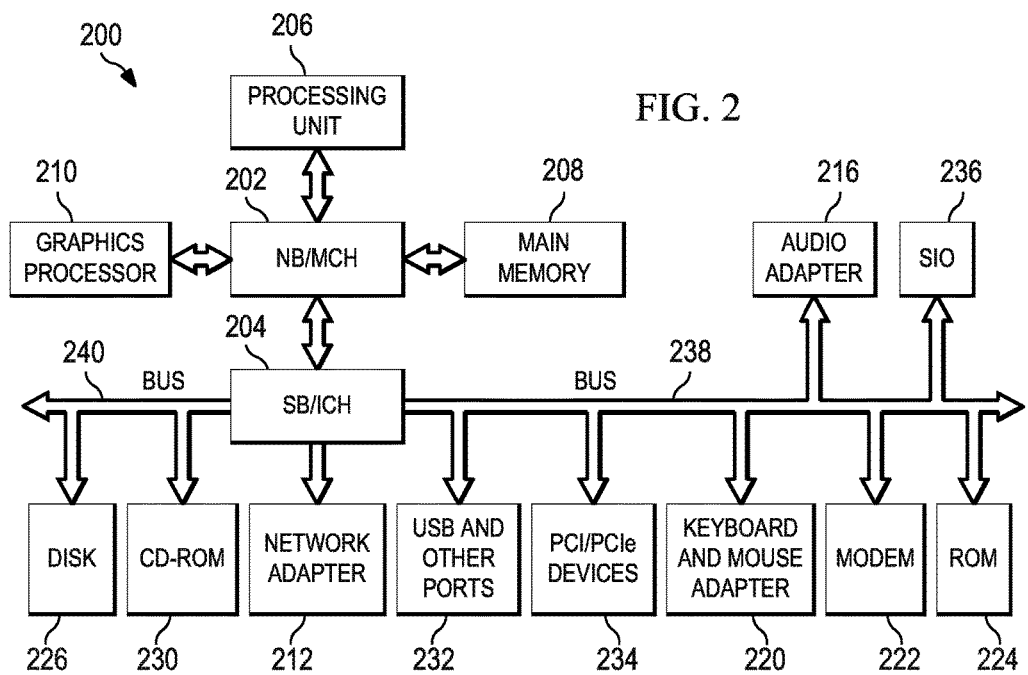
FIG. 2 depicts a block diagram of a data processing system in which illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, Application 105 in server 104 is an implementation of an embodiment described herein. Application 105 operates in conjunction with Natural Language Processing (NLP) engine 103. NLP engine 103 may be, for example, an existing application capable of performing natural language processing on documents, and may be modified or configured to operate in conjunction with application 105 to perform an operation according to an embodiment described herein. Storage 108 includes library of hypotheses 109 according to an embodiment. Client 112 includes document with tabular data 113 that is processed according to an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers. In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts an example of tabular data within which functional dependencies can be identified in accordance with an illustrative embodiment. Table 300 is an example of tabular data appearing in document 113 in FIG. 1 within which functional dependencies can be determined using application 105 in FIG. 1, for example.

The horizontal or vertical rule-lines are depicted for bounding a table and cell only as an example without implying a limitation thereto. A table or tabular data can be expressed in any suitable manner, and a cell can be demarcated in any manner within the scope of the illustrative embodiments. For example, indentation, spacing between cell data, different spacing in tabular and non-tabular content, symbols, graphics, a specific view or perspective to illustrate tabular data, or a combination of these and other example manners of expressing tabular data and cells therein are contemplated within the scope of the illustrative embodiments.

Table 302 is a portion of table 300 and includes several headers that serve to organize the data in the various cells into headings, categories, or classifications (categories). The headers can be row-headers or column headers. The headers are not limited to the table boundaries or extremities within the scope of the illustrative embodiments. For example, a header can be embedded within a table, between cells, such as in the form of a sub-header, for example, to identify a sub-category of tabular data. Such sub-row or sub-column headers are contemplated within the scope of the illustrative embodiments. In one embodiment, certain header information can be specified separately from the corresponding tabular data, such as in a footnote, appendix, another table, or another location in a given document.

For example, header 304 identifies a group of columns, which include data for the broad category of "fiscal year ended January 31." Headers 306, 308, and 310 identify sub-categories of the "fiscal year ended January 31" data, namely, by year for three example years.

Row headers 312 include some clues, both in content and organization, for identifying dependencies between cells. For example, row header 314 is a "total" and is indented under row headers 316 and 318. Similarly, row header 320 is another "total" and is indented under row header 322. The indentations at row headers 314 and 320 are example organizational clues that are useful in understanding the functional relationships between cells in the same row as row headers 314 and 320, and other cells in table 302. The word "total" in row headers 314 and 320 are another example of the content clues usable for determining functional dependencies of cells in their corresponding rows in a similar manner. That is, content clues may provide clues to functional relationships between cells by having terms, functional definitions, equations, or the like, that are identifiable and indicative of the relationships based on the content of the headers/cells themselves. The organizational clues provide clues based on their hierarchical or other organizational relationships with one another.

These example clues are not intended to be limiting on the illustrative embodiments. Many other clues or the content, organizational, or other types, will be conceivable from this disclosure by those of ordinary skill in the art, and the same are contemplated within the scope of the illustrative embodiments. Hereafter, the organizational, content, or other types of clues will be referred to collectively as "clues" for ease and clarity of the following description of the illustrative embodiments.

As can be appreciated, the same clues help understand the information in different cells differently. For example, consider table 352, which is another portion of table 300. Header 354 identifies a group of columns, which include data for the broad category of "Change." Headers 356 and 358 identify sub-categories of the "change" data, in other words, comparisons of two consecutive years, from the three example years of categories 306, 308, and 310.

Row headers 312 impart different meanings to the cells in their corresponding rows in tables 302 and 352. For example, while the "total" according to row header 314 implies a dollar amount of income in the corresponding cells in table 302, the same row header implies a dollar amount change and a percentage change in the corresponding cells in table 352. As in this example table 300, in an embodiment, the clues in one location, such as in row headers 312, can also operate in conjunction with other clues, data, or content in other places, to enable determining the meaning of certain cells in a given tabular data.

Figure 4B:
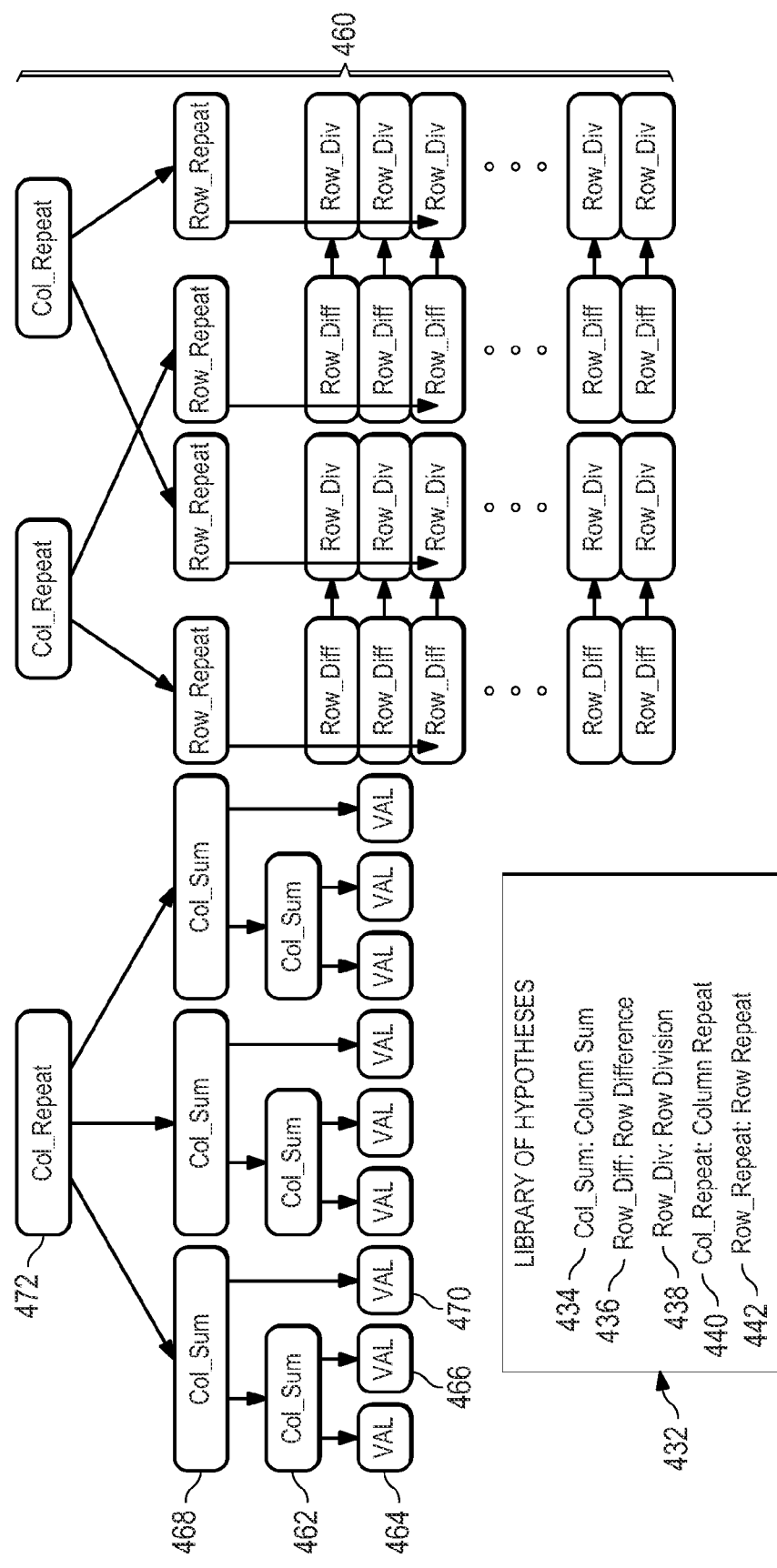

With reference to FIGS. 4A and 4B, these figures depict a block diagram of a manner of discovering relationships in tabular data in accordance with an illustrative embodiment. Table 400 is the same as table 300 in FIG. 3. Tables 402, 452 are analogous to tables 302 and 352 respectively in FIG. 3. Column headers 404, 406, 408, and 410 are analogous to headers 304, 306, 308, and 310 respectively in FIG. 3. Row headers 412-422 are analogous to row headers 312-322 respectively in FIG. 3. Similarly, column headers 454, 456 and 458 of table 452 are analogous to headers 354, 356 and 358 respectively in FIG. 3.

As noted with respect to FIG. 3, clues in and around a given tabular data can assist in determining the functional dependencies of a cell. Similarly, markups in a given table can also form additional clues and assist in that determination, reinforce a previous determination, or both. For example, lines 424 and 426 are example table markups that act as additional clues in determining functional dependencies of some cells. As noted above, lines or other notations for expressing a table or cell demarcation are only examples, and not intended to be limiting on the illustrative embodiments. Tables and cells can be expressed without the use of express aids, such as lines 424 and 426, within the scope of the illustrative embodiments.

As an example, row header 414 indicates that cell 428 contains a total or summation of some values presented elsewhere, perhaps in table 402. In other words, a clue in header 414 helps determine a functional dependency of type "sum" of cell 428 on some other cells.

Line 424 reinforces this determination, and helps narrow a range of cells that might be participating in this functional dependency. For example, an embodiment concludes that contents of cell 428 are a total, or sum, of the cell values appearing above line 424 up to another delimiter, such as another line, table boundary, or the like.

As another example, row header 420 indicates that cell 430 contains a total or summation of some values presented elsewhere, perhaps in table 402. In other words, a clue in header 420 helps either determine or confirm a hypothesis of a functional dependency of type "sum" of cell 430 on some other cells.

Line 426 reinforces this determination, and helps narrow a range of cells that might be participating in this functional dependency. For example, an embodiment concludes that contents of cell 430 are a total, or sum, of the cell values appearing above line 426 up to another delimiter, such as another line, e.g., line 424.

Lines 424 and 426 are described as example structural markups or clues only for clarity of the description and not as a limitation on the illustrative embodiments. Another example markup that can similarly assist in determining functional relationships between cells is a semantic clue, such as compatible row and column type. For example, when a row header of a cell indicates a revenue value and the column header of a cell indicates a year, it is likely that the cell in that row and column at least includes a revenue value in that year, and perhaps is related to certain other values in the same column by a sub-total type functional relationship. In this example, a clue relates to a specific cell. Such a cell-specific clue is useful in confirming a functional dependency for that cell, and may or may not be usable for confirming similar functional dependency across the whole column.

As another example, the presence of a common header 404 hints at a commonality in columns 406, 408, and 410. Separately, an embodiment can conclude that the content of headers 406, 408 and 410 all have semantic type "Year." The embodiment determines a hint that these three columns are similar. When the embodiment finds that the same functional dependencies hold in those three columns, the embodiment assesses a confidence level in that finding using the fact that this hint or clue supports the confidence level. A hint as described above is a column-wide hint. A hypothesis that a dependency holds over a number of columns is a column-wide hypothesis. A column-wide hint is useful in supporting a column-wide hypothesis.

An embodiment uses some of the available markups or clues in and around the table to hypothesize a functional dependency. An embodiment further uses other available clues or markups to confirm the hypothesis, thereby improving a confidence level in the hypothesis. Essentially, a hypothesis is a framework of a functional dependency—a hypothetical relationship between hypothetical cells—which when applied to an actual table and constituent cells can be true or false for all cases where applied, or sometimes true and sometimes false.

A hypothesis is confirmed or supported, or in other words, confidence in a hypothesis is above a threshold, if clues or markups support an instance where the functional dependency according to the hypothesis yields a correct result. Confidence in a hypothesis is also increased from one value to another, such as from below a threshold level of confidence to above the threshold level of confidence, if the functional dependency according to the clue can be replicated at other cells or cell-ranges in the given tabular data (i.e., a clue holds true, or supports the hypothesis).

In machine learning terms each clue in a set of all possible supporting clues is called a "feature." Presence or absence of a feature for an existing hypothesis increase or decrease the confidence level in that hypothesis. A "model" according to an embodiment is a mechanism to compute the confidence score for a hypothesis based on a subset of features that are present (or support) the hypothesis. In one embodiment, the model operates as a rule-based engine. In another embodiment, the model is 'trainable' by using a training set of tables for which confidence score is known a priori (i.e., a "labeled set").

Library of hypotheses 432 is analogous to library of hypotheses 109 in FIG. 1. Library of hypotheses 432 is a collection of hypotheses that an embodiment, such as in application 105 in FIG. 1, receives for determining functional dependencies in table 400. In one embodiment, a user supplies library of hypotheses 432. In another embodiment, an application provides library of hypotheses 432. In one embodiment, library of hypotheses 432 is a part of a larger library of hypotheses (not shown), and is selected according to some criteria. An example criterion for selecting the member hypotheses of library of hypotheses 432 can be domain-specificity. For example, library of hypotheses 432 may include only those hypotheses that are applicable to the domain of the tabular data being analyzed. Constituent hypotheses in library of hypotheses 432 can be changed as the tabular data changes.

In example library of hypotheses 432 as depicted, hypothesis 434 hypothesizes that some cells are a sum of some other cells in the same column, i.e., are "column sums," or "col_sum." Similarly, hypothesis 436 hypothesizes that some cells are a difference between certain other cells in the same row, i.e., are "row difference," or "row_diff." Hypothesis 438 hypothesizes that some cells are a division of certain other cell in the same row with another cell in the same row or a constant, i.e., are "row division," or "row_div."

Hypothesis 440 hypothesizes that some hypotheses repeat in different columns, i.e., are "column repeat," or "col_repeat." For example, "column sum" hypothesis 434 can repeat in column 406, and in columns 408 and 410. Similarly, hypothesis 442 hypothesizes that some hypotheses repeat in different rows, i.e., are "row repeat," or "row_repeat." For example, "row difference" hypothesis 436 can repeat in row 416, and in rows 418 and 414. Applicability of one hypothesis can boost the confidence in applicability of another hypothesis in this manner. In other words, if hypothesis 434 seems to indicate functional dependency between certain cells, and hypothesis 440 seems to validate the applicability of hypothesis 434 across more than one columns, an embodiment exhibits higher than a threshold level of confidence in the functional dependency indicated by hypothesis 434.

Graph 460 shows the various example hypotheses in library of hypotheses 432 in operation on table 400. For example, at element 462 in graph 460, hypothesis col_sum appears to apply to a set of values bound between lines 424 and the beginning of data in table 402, i.e., elements 464 and 466 in graph 460, and results in the value in cell 428. Similarly, at element 468, hypothesis col_sum also appears to apply to the cells between lines 424 and 426, one of which is a result of a previous application of the same hypothesis at element 462, and the other is element 470, and results in the value in cell 430. Element 472 in graph 460 indicates that the arrangement of elements 462, 464, 466, 468, and 470 repeats according to hypothesis 440 in columns 408 and 410 in table 402. Remainder of graph 460 similarly determines the functional dependencies in table 452.

Thus, in the example depicted in FIGS. 4A and 4B, the examples of determined dependencies indicate repeatable patterns and are validated by the supporting computation on the cells involved. Given a suitable threshold level, an embodiment can express a confidence level that exceeds the threshold level. Accordingly, the embodiment outputs a natural language processed form of the cells of table 400 whereby the cell values are expressed, not only by reference to their denominations or headers, but also by their inter-relationships.

For example, the value in cell 428 would be expressed not only as "two million, one hundred fifty one thousand, three hundred and forty one dollars of total revenues and non-operating income in 2009" but also as "a total of the income in electric and gas categories of the revenues and non-operating income in the year 2009." Such natural language processing with the benefit of an embodiment is far more useful and informative than what can be produced from the presently available NLP technology.

Figure 5:
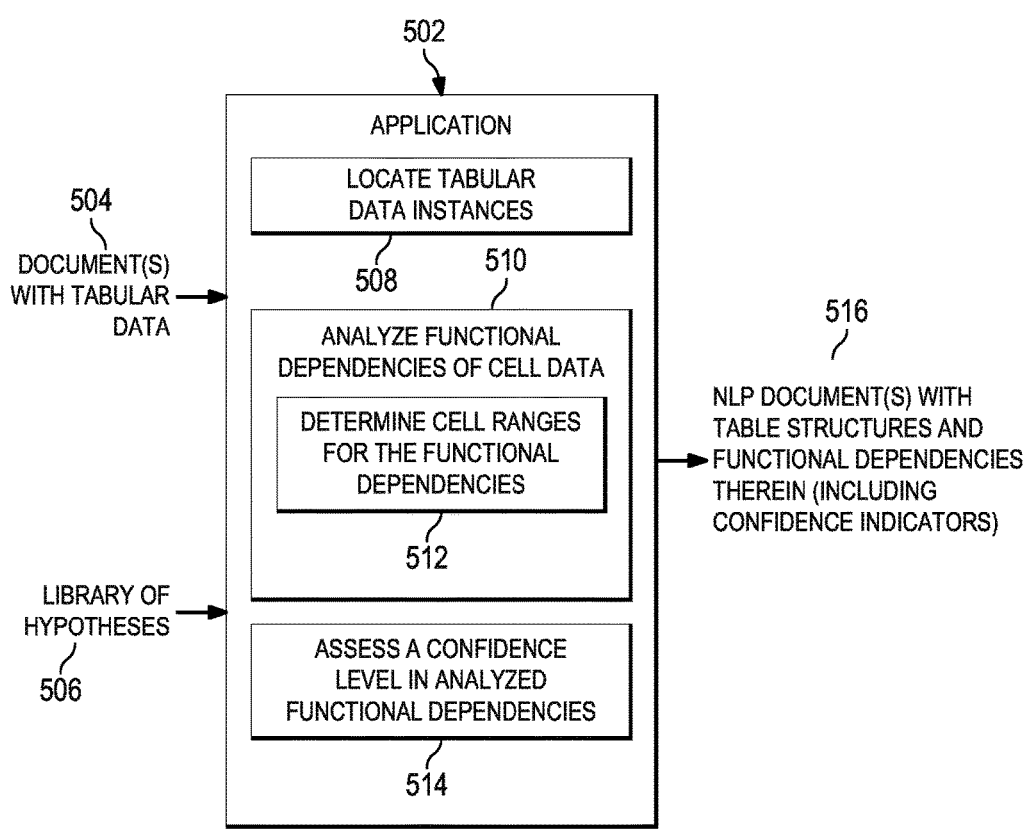
FIG. 5 depicts a block diagram of an application for discovering relationships in tabular data in accordance with an illustrative embodiment.

With reference to FIG. 5, this figure depicts a block diagram of an application for discovering relationships in tabular data in accordance with an illustrative embodiment. Application 502 can be used in place of application 105 in FIG. 1. Application 502 receives as inputs 504 and 506, one or more documents with tabular data, and a library of hypotheses, respectively. Application 502 includes functionality 508 to locate instances of tabular data in input 504. Using library of hypotheses 506 functionality 510 analyzes the functional dependencies of cell data in an instance of tabular data located by functionality 508 in input 504.

In performing the analysis, functionality 510 uses functionality 512 to determine cell-ranges participating in a given functional dependency. Some example ways of determining cell-ranges using clues and markups are described in this disclosure.

Functionality 514 assesses a confidence level in a functional dependency analyzed by functionality 510. Functionality 510, 512, and 514 operate on as many cells in as many table instances as needed in a given implementation without limitation. Application 502 outputs one or more NLP documents 516, with table structures and functional dependencies identified therein, optionally including any suitable manner of indicating confidence levels in one or more such functional dependencies.

Figure 6:
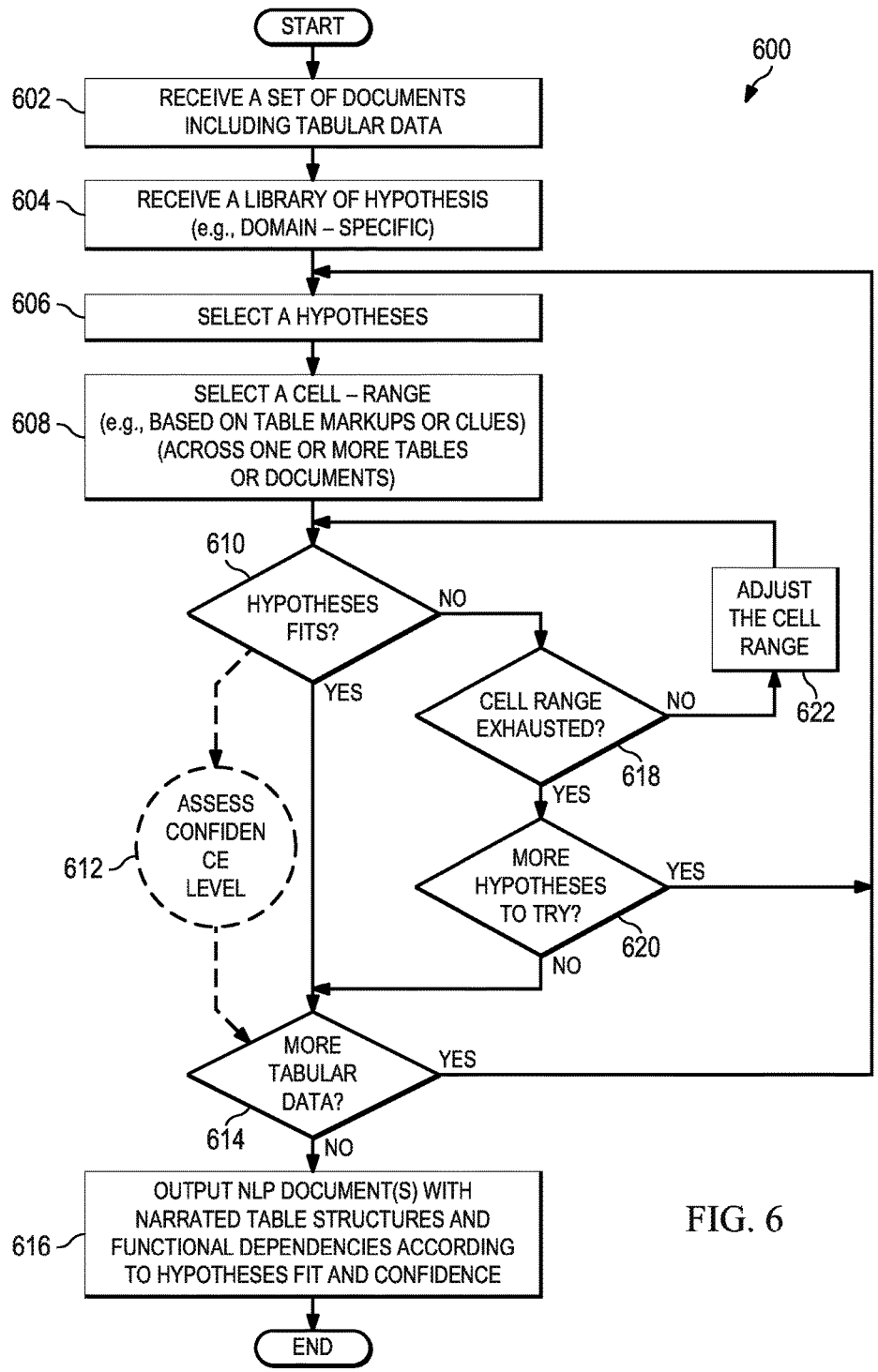
FIG. 6 depicts a flowchart of an example process for discovering relationships in tabular data in accordance with an illustrative embodiment.

With reference to FIG. 6, this figure depicts a flowchart of an example process for discovering relationships in tabular data in accordance with an illustrative embodiment. Process 600 can be implemented in application 502 in FIG. 5. Process 600 begins by receiving a set of one or more documents that include tabular data (step 602). Process 600 receives a library of hypotheses (step 604). For example, the library of hypotheses can be limited to include only those hypotheses that are applicable to the subject-matter domain of the documents received in step 602.

The complexity of finding functional dependencies increases exponentially with the size of table being analyzed and the number of hypotheses in a given library of hypotheses. Thus, an embodiment optimizes the detection of functional dependencies by limiting the number or types of hypotheses in a given library of hypotheses, limiting the cell-ranges to search for functional dependencies, or a combination thereof.

Process 600 selects a hypothesis from the library of hypotheses (step 606). Process 600 selects a cell-range, such as by using clues, markups, or variations thereof, in some combination of one or more such clues, markups, or variations, across one or more tables or surrounding contents in one or more documents (step 608). Process 600 determines whether the selected hypothesis fits the selected cell-range (step 610). For example, as described with respect to FIGS. 4A and 4B, process 600 may determine whether a cell in question computes as a column sum from a cell-range bound by certain markups above that cell. This example way of determining whether the selected hypothesis fits is not intended to be limiting on the illustrative embodiments. Because the hypothesis being used can be any suitable hypothesis according to the documents being analyzed, any suitable manner of determining whether the hypothesis is satisfied can be used within the scope of process 600.

If the selected hypothesis fits the selected cell-range ("Yes" path of step 610), process 600 proceeds to step 614. In one embodiment, after determining that a collection of clues support a hypothesis, process 600 assesses a confidence level in the functional dependency according to the hypothesis (block 612). An embodiment implements block 612 separately from process 600, and performs the confidence level assessment separately from process 600, such as in a different iteration, pass, or process. An embodiment of block 612 is described as process 700 in FIG. 7.

Process 600 determines whether more tabular data has to be analyzed to determine functional dependencies of cells (step 614). If more tabular data has to be analyzed ("Yes" path of step 614), process 600 returns to step 606. If no more tabular data is to be analyzed ("No" path of step 614), process 600 outputs one or more NLP documents, with table structures and functional dependencies according to the hypotheses-fit and confidence (step 616). Process 600 ends thereafter. In one embodiment, process 600 outputs table structures and functional dependencies data according to the hypotheses-fit and confidence, for use in an existing NLP engine, such as NLP engine 103 in FIG. 1, which produces the NLP document.

At step 610, if process 600 determines that the selected hypothesis does not suitably fit the selected cell-range ("No" path go step 610), process 600 determines whether the cell-range has been exhausted for the selected hypothesis (step 618). For example, if the selected hypothesis is a "column sum" and the cell-range above the cell being evaluated has been reduced to zero cells, the cell-range would be exhausted for that hypothesis. Cell-range exhaustion is a hypothesis-dependent concept, and can be determined in any suitable manner according to the hypothesis being considered.

If the cell-range has been exhausted ("Yes" path of step 618), process 600 determines whether more hypotheses remain to be tried for the cell whose function dependency is being analyzed (step 620). If one or more hypotheses can be tried ("Yes" path of step 620), process 600 returns to step 606. If no more hypotheses are to be tried ("No" path of step 620), process 600 proceeds to step 614.

If a cell-range has not been exhausted ("No" path of step 618), process 600 adjusts the cell range, such as by increasing the number of cells in the range, decreasing the number of cells in the range, changing to a different range of cells, or a combination of these and other possible changes (step 622). Process 600 then returns to step 610.

Figure 7:
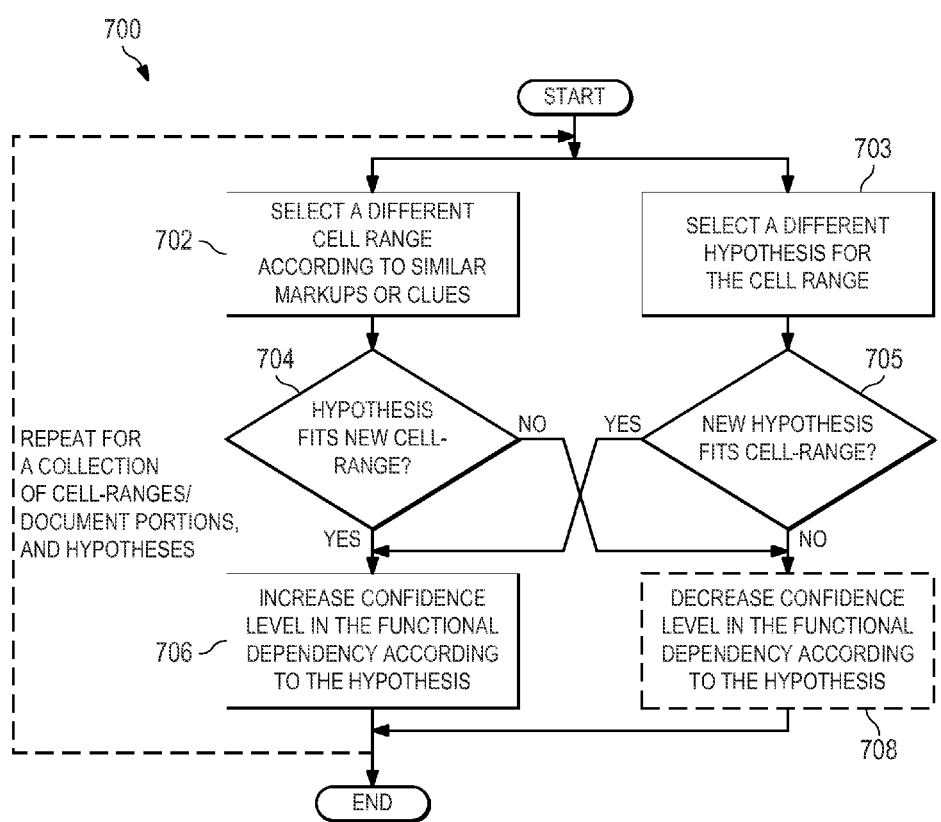
FIG. 7 depicts a flowchart of an example process for assessing a confidence level in accordance with an illustrative embodiment.

With reference to FIG. 7, this figure depicts a flowchart of an example process for assessing a confidence level in accordance with an illustrative embodiment. Process 700 can be implemented as block 612 in FIG. 6. One branch of process 700 begins by selecting a different cell-range according to similar markups or clues (step 702). For example, in one embodiment, process 700 selects comparable cell-ranges in different columns or rows having similarly purposed data. In another embodiment, process 700 considers (not shown) other semantic clues, structural clues, denominations and type compatibilities among cells, suggestive words or phrases such as "total" or "sub-total", or a combination of these and other aids to select a different cell-range to verify a fit for the selected hypothesis.

In other words, for a cell-range and a hypothesis that is true for that range an embodiment searches for a set of supporting clues (features). That set of supporting clues may include not only markups or semantic clues, but also other hypotheses that were found true on that cell-range. The embodiment thus finds a collection of supporting evidence for that hypothesis on that cell-range. The embodiment then computes a total confidence score based on the collection of supporting evidence.

Process 700 determines whether the hypothesis (a primary hypothesis) fits the new cell-range selected in step 702 (step 704). If the hypothesis fits the new cell-range ("Yes" Path of step 704), process 700 increases the confidence level in the functional dependency according to the hypothesis (step 706). Process 700 ends thereafter. If the hypothesis does not fit the new cell-range ("No" path of step 704), process 700 may end or repeat thereafter, leaving the confidence level unchanged, or may decrease the level of confidence (step 708). For example, the value of a feature can be positive, zero or negative. For example, if there is no common header across three example columns, the value of the corresponding feature might be zero—that is, neutral. However, if the three columns have different semantic types, that feature will likely be negative thereby actually decreasing the confidence.

Another branch of process 700 begins by selecting a different hypothesis (a secondary hypothesis) fits the cell-range where another hypothesis (the primary hypothesis already fits), (step 703). Process 700 determines whether the other hypothesis—the secondary hypothesis—fits the cell-range (step 705). If the secondary hypothesis fits the cell-range ("Yes" Path of step 705), process 700 increases the confidence level in the functional dependency according to the hypothesis at step 706. Process 700 may end thereafter. If the secondary hypothesis does not fit the cell-range ("No" path of step 705), process 700 may end or repeat thereafter, leaving the confidence level unchanged, or may decrease the level of confidence at step 708.

When process 700 repeats, process 700 repeats for different cell-ranges and different secondary hypotheses in a similar manner. A repeat iteration evaluates different hypotheses across different ranges and found results. A secondary hypotheses may not apply to a cell-range initially, but, as more dependencies are discovered, the secondary hypotheses (and other higher-order hypotheses)(not shown) may start matching other cell-ranges and supporting other found results. Such matches or support may in-turn trigger testing other hypotheses, and so on (not shown).

During the confidence assessment phase an embodiment attempts to create a collection of various "features" that might increase the confidence level in a functional dependency. An embodiment regards the presence of second-order dependencies, as indicated by a secondary hypothesis fit (misfit), as yet another confidence-increasing (decreasing) feature. Applicability across cell-ranges is depicted in described in the several embodiments only as examples, without implying a limitation thereto. A feature set considered for confidence-level change is not limited only to range-similarity, but may be derived from many other characteristics of tabular data usable as clues, such as including but not limited to various markup clues, layout clues (i.e. common category header), semantic clues (i.e. all headers have the same semantic type (i.e. 'Year'), and derived discovered dependencies like similar dependency in multiple rows.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for discovering relationships in tabular data. An embodiment uses a library of hypotheses to test whether portions of a given tabular data have a particular structure and functional dependency. A hypothesis is tested for one or more cell-ranges to determine whether an outcome of the hypothesis is supported by computations using the selected cell-ranges. A confidence level is associated with the functional dependency within the cell-range according to the hypothesis. The cell-ranges are selected based on a plurality of criteria including variety of clues and markups in the tabular data, content surrounding the tabular data or elsewhere in the given set of documents.

Clues and hypothesis confirmations are described using cell-ranges in some embodiments only as examples and not to imply a limitation thereto. Information, clues, or features, to support selecting a particular hypothesis can come from any portion of a given document, including content other than tabular data in the document, within the scope of the illustrative embodiments.

Some embodiments are described with respect to pre-determined hypotheses or known functions only as examples and not to imply a limitation on the illustrative embodiments. An embodiment can also hypothesize a previously unknown or un-programmed functional dependency, in the form of a learned function. For example, an embodiment may apply some analytical technique on data in a given table and find a statistical data pattern in the tabular data. The embodiment can be configured to account for such findings in the form of a learned function or learned hypothesis within the scope of the illustrative embodiments. The embodiment can then include the learned hypothesis into the collection for further validation or confidence level assessment.

The description of the examples and embodiments described herein are described with respect to clues, hypotheses, documents, tabular data, and NLP in English language is not intended to be limiting on the illustrative embodiments. An embodiment can be implemented in a similar manner using clues, hypotheses, documents, tabular data, and NLP in any language within the scope of the illustrative embodiments.

The above description illustrates the functionality of the present invention, in various embodiments, to identify functional relationships or dependencies between cells in tabular information of one or more documents during natural language processing of the one or more documents. The functional dependencies may be determined from within a single table structure of a single document, from across multiple table structures in a single document, or from across multiple table structures of multiple documents. The discovered functional dependencies may be utilized when performing natural language processing processes, such as may be used for various purposes. One such purpose is to utilize natural language processing as part of a Question and Answer (QA) system, such as the Watson™ QA system available from International Business Machines Corporation of Armonk, N.Y. For example, the discovered functional dependencies may be utilized by such a QA system when performing annotation operations for annotating documents of a corpus for later use in performing question answering operations.

In addition to the above, the illustrative embodiments further provide mechanisms for correcting incorrect information in table structures of documents or supplementing such table structures with information that might be missing from the table structures. That is, as mentioned above, information in table structures of documents may be incorrect or missing due to many different reasons including errors in optical character reading (OCR) operations, data corruption, user error when performing data entry, or the like. However, these table structures may contain information that is critical for understanding the document in general and thus, it is important to correct the information or provide the missing information whenever possible. The illustrative embodiments provide mechanisms for making such corrections, either automatically or with the assistance of a human user, based on the leveraging of redundant information in a corpus of documents and automatically generated queries based on the context surrounding the erroneous or missing table data values, submitted to a QA system. Based on the confidence of the results generated by the QA system, automatic or semi-automatic correction of erroneous or missing data values is performed.

With this additional capability of the illustrative embodiments, given a table structure, in a document, which contains an erroneous or missing value in a cell of the table structure, the illustrative embodiments correct or generate the value in the cell by generating one or more queries from the context surrounding the erroneous or missing value and submitting those one or more queries to a QA system for generating of candidate results which may be used to correct or generate the value in the cell. That is, from the discovered functional dependency structure discovered using the mechanisms previously described, the illustrative embodiments infer a substructure of a portion of the table which contains the incorrect or missing data values as conforming with the larger structure. Then, using this known relationship between individual cells, the illustrative embodiments generate one or more queries based on the known relationship, e.g., relationships between headers of columns/rows in the table data structure, etc. The queries are submitted to a QA system which applies the queries to a corpus of documents which then generates one or more candidate answers based on the queries and one or more corresponding measures of confidence. The measures of confidence may be compared against one or more threshold confidence values to select a candidate answer as a replacement for the erroneous or missing data value in the cell. Moreover, the measure of confidence of the selected candidate answer may be compared against a threshold value to determine if automatic replacement of the cell's data value is to be performed or if a notification is to be sent to a human user for authorization to perform the replacement. Thus, mechanisms are provided for correcting erroneous or missing content of a document, e.g., a data value of a cell in a table structure of a document, based on inferring the correct content from a corpus of documents.

This additional automatic or semi-automatic correction capability of the illustrative embodiments further augments the discovery of functional dependencies as described above by providing mechanisms for identifying erroneous cells in a table structure and then, having identified them, using the discovered functional dependencies and other context information to correct the erroneous cells, where an erroneous cell is a cell that either stores an incorrect data value or has a missing data value. Moreover, in some illustrative embodiments, rather than actually correcting an erroneous or missing data value in a table structure based on the discovered functional dependencies, operations may be invoked to alert a human user of the erroneous or missing data value indicating the nature of the error in the data value, e.g., a cell requiring a date value instead has a floating point value or the data value is simply missing, and suggesting a correct data value for replacing the erroneous or missing data value and providing the user with the option to accept or reject the suggested correct data value. If the user accepts the correct data value, then the table structure may be automatically updated. If the user rejects the correct data value, then the table structure may not be updated and the user may or may not instead specify a different data value to replace the erroneous or missing data value.

In order to identify erroneous cells, various algorithms and heuristics may be employed. For example, in one illustrative embodiment, a block of cells may be predefined, e.g., a certain number of columns and rows in the table structure may be specified, and the block of cells may be analyzed to determine if they have a regular structure, e.g., a repeatable pattern, defined or discovered dependency relationship, or the like. If the block of cells has a regular structure, the block of cells may be further analyzed to determine if one or more of the cells in the block of cells does not match the regular structure. For example, if a block of cells corresponds to a listing of numerical values, and a cell comprises an alphabetical entry, such as a word, string of letters, or the like, then the cell may be determined to be not in conformance with the regular structure of the block of cells. As another example, if a block of cells corresponds to a listing of dates, and a cell in the block comprises a floating point number, then it may be determined that the cell is suspicious of being erroneous because it does not appear to be in conformance with the regular structure of the block of cells.

The identification of cells that are suspicious of being erroneous may make use of various table formatting hints, such as column headers, row headers, cell formulas, and the like, to assist in identifying the regular structure of the block of cells and determining those cells that do not fit with the identified regular structure. Moreover, various artificial intelligence and machine learning methods may be employed to assist in identifying suspicious cells within the table structure. For example, features extracted during natural language processing of a document and the table structure, such as markup language information, layout information, functional clues, and the like, may be used to infer functional dependencies within the table structure. This facilitates training and using machine learning models which can then be used to signal the presence of a functional dependency within a table structure. The presence of erroneous or missing data values within the table structure may be performed by identifying portions of the table structure that break the functional dependencies identified by the machine learning models.

For example, the mechanism described previously for identifying functional dependencies between cells may be used to identify the functional dependency of a cell within a block of cells by looking at the information that is able to be gathered from other cells, headers, the title of the table, and other information about the content and structure of the table. For example, an arithmetic dependency (e.g., sum, product, unit conversion, ratio, etc.) or known enumerations (e.g., days of the week, months of the year, time of day, etc.) may be identified for the cell by looking at the cells around the cell in question, the headers of columns/rows, the title of the table, formulas associated with cells, and the like. If a functional pattern is identified to be true for other column and/or row dependencies in the cell block, except for the row/column containing the cell, or the cell itself, then this cell is likely to be storing an erroneous data value or a missing data value, and thus is a suspicious cell whose data value needs to be corrected or otherwise provided.

The identification of suspicious cells within blocks of cells may be repeated for each block of cells in a table structure. Thus, a single block of cells may have zero or more suspicious cells, and a table structure may have multiple blocks of cells with each block of cells having zero or more suspicious cells identified within them.

Having identified a suspicious cell within a block of cells using the mechanisms described above, the context surrounding the suspicious cell is determined and used as a basis for generating one or more queries to be used with a QA system. In generating the queries, the illustrative embodiments analyze context information, such as column headers, row headers, table titles, hierarchical structures of headers and titles, and the like, along with identified dependency relationships between cells of tables, grammatical rules, and the like, to determine a semantic signature of the cell which is informative of how to convert text or individual table cells into natural language sentences. Based on this information, table narration mechanisms are employed to convert the context surrounding a suspicious cell into a narrated statement with the erroneous or missing data value present in the narrated statement. The narrated statement serves as a semantic signature for the suspicious cell. One example table narration mechanism that may be employed is described in commonly assigned and co-pending U.S. patent application Ser. No. 13/838,130 entitled "Adapting Tabular Data for Narration," filed Mar. 15, 2013, which is hereby incorporated by reference in its entirety.

Such semantic signatures are of the general type of <cell semantic reference> [fact(s)]. In this format, for a cell having a column header of "2007" and a row header hierarchy of "Revenues and non-operating income"→"electric", with the cell having a value of $1,899,457, a semantic signature of "Electric Revenue for 2007 is $1,899,457" may be generated where the cell semantic reference is "Electric Revenue for 2007" and the fact is "$1,899,457".

The semantic signature describes what the suspicious cell represents. Using semantic signatures facilitates answering questions from table data structures. For example, a question of "What is electric revenue for 2007?" may be answered directly by finding a cell with a semantic signature matching the semantic signature in the query and returning its contents.

It should be appreciated that semantic signatures do not need to be unique either inside one table, or across multiple tables, such as may be present in multiple documents of a corpus. For example, electric revenue for the same issuer in 2007 may occur in a number of documents. Many documents, for example, may contain comparative revenue numbers across a number of years. Thus, the "2007" value may appear in a document directed to "2008" revenue comparisons, or the like. This creates a de-facto redundancy in a corpus of documents. The illustrative embodiments exploit this de-facto redundancy to perform error correction in suspicious cells of a table in a document by querying the corpus of documents based on the semantic signature of the suspicious cell to identify redundant information in other documents of the corpus that may offer the correct content for the suspicious cell.

For example, with the mechanisms of the illustrative embodiments, the semantic signature generated for the suspicious cell generated using the table narration mechanism may be converted to a natural language question. The natural language question may then be input to a QA system as an input question upon which the QA system operates to search a corpus of documents for one or more candidate answers to answer the input question. Alternatively, rather than using a natural language question and a QA system, one or more structured requests may be generated and sent to a document database which may then apply the structured requests against the document database to identify results for the structured requests. In general, one may consider these operations the generation of queries that are applied against a knowledge base, e.g., corpus of documents, document database, or the like, in order to generate results in response to the queries. For purposes of the following description, it will be assumed that the knowledge base is a corpus of documents operated on by a QA system based on an input question submitted to the QA system that is generated from the semantic signature of a suspicious portion of content in a document, e.g., a suspicious cell in a table data structure of a document.

For example, if a document processing system determines that a value in a cell corresponding to the semantic signature "Electric Revenue for 2007" is questionable, e.g., because of an OCR error, or the like, the document processing system may submit the question "what is the Electric Revenue for 2007" to a QA system which will generate one or more queries that are applied to an already existing corpus of documents to find information in other documents matching the semantic signature specified in the question. The QA system returns a listing of candidate answers and their corresponding confidence measures as a result of applying the one or more queries to the already existing corpus of documents. The confidence measures may be evaluated to determine if one of the candidate answers has sufficient confidence to be selected as a replacement for the questionable content of the cell. Furthermore, the confidence measure for the selected candidate answer may evaluated to determine if the confidence measure is sufficient to warrant automatic replacement of the questionable content of the cell or if a notification should be sent to a human user to obtain authorization to replace the questionable content. In the latter case, the mechanisms of the illustrative embodiments may generate a notification to the human user which contains one or more suggested corrections for the questionable content of the cell including information about the source of the one or more suggested corrections, e.g. document name, table name within the document, publication information, author information, or any other source information that may be of use by a human user in determining whether to trust the source of the suggested correction.

FIG. 8A is an example diagram of a portion of a table structure that may be found in a document processed by a natural language processing system, in which an erroneous data value is present within the table structure. In the example shown in FIG. 8, the portion of the tabular data in the document being processed includes a summary of revenues, expenses and changes that includes a plurality of columns for different calendar years 2007-2009 and rows corresponding to different categories of revenues and expenses.

As can be seen from FIG. 8A, each of the columns follows a repeated pattern of functional dependency with regard to the total operating revenues in row 4. The data value in cell B4 breaks this repeated pattern of functional dependency in that cell B4 contains the erroneous data value "rei/xz" which is not what would be expected if the functional dependency were followed. Thus, cell B4 may be identified as an erroneous cell whose data value needs to be corrected. It is also possible to "guess" that the cell B4 contains an erroneous data value based on one set of criteria, e.g., that all cells around that cell have numeric values and thus, it is expected that cell B4 should have a numeric value, but then to infer the correct data value for the cell B4 the mechanisms of the illustrative embodiments must discover that cell B4 is part of a functional dependency.

FIG. 8B represents another document in a corpus of documents in which cells having a similar semantic signature may be found in accordance with one illustrative embodiment. As shown in a comparison of FIGS. 8A and 8B, both documents contain table structures having cells with a semantic signature of "Gas revenue for 2007". The document in FIG. 8B represents a document already in a corpus of documents while the document in FIG. 8A represents a document that is being processed by a document processing system and in which a suspicious cell is identified, such as in the manner described above. The document in FIG. 8B, i.e. the earlier document, was already adapted and loaded into the knowledge base, e.g., the corpus of documents upon which a QA system operates, with the semantic signature of the revenue block being recognized.

In the example illustrated in FIGS. 8A and 8B, the document processing system needs to find out the true value for the cell "Gas revenue for 2007" in the document being processed, i.e. the document of FIG. 8A. Using the mechanisms of the illustrative embodiments, relational dependencies, patterns, and the like, are used to identify a suspicious cell in the table of the document being processed (document of FIG. 8A). Having identified a suspicious cell in the table of the document, table narration is performed on the suspicious cell in order to generate a semantic signature. As mentioned above, in one illustrative embodiment, the mechanisms of co-pending and commonly assigned U.S. patent application Ser. No. 13/838,130 may be used to perform the table narration to generate the semantic signature for the suspicious cell. In other illustrative embodiments, other table narration techniques may be utilized as will become apparent to those of ordinary skill in the art in view of the present description. For example, through analysis of the row and column headers of the table corresponding to the suspicious cell, as well as analysis of the relational dependencies between cells to identify the type of value to be stored in the cell, a narrative for the cell may be determined. In the present example, regardless of which table narration mechanism is used, a semantic signature of "Gas revenue for 2007" may be determined.

The semantic signature of the suspicious cell may be converted to a query through a query generation engine's application of query generation rules that convert statements to queries. For example, the statement "Gas revenue for 2007" coupled with an answer type of numerical, may be converted to a query of the type "What is the gas revenue for 2007" by appending the question "what is" to the semantic signature for the cell. Similarly, for statements coupled to answer types that are of a name type, appending the question "who is" may convert a semantic signature's statement into a query that can be input to a knowledge base for generation of answers. Question generation rules take into account the type of answer that is being sought and other semantic and grammatical rules for the language of the question in order to generate the natural language question for submission to the QA system. Alternatively, the question generation engine may instead formulate structured queries directly, such as by using the Structured Query Language (SQL) or the like, that can be applied to a database of documents rather than generating a natural language question for submission to a QA system.

Assuming an embodiment in which a QA system is utilized, the natural language question is submitted as an input question to the QA system which operates on it as it would any other input question by generating one or more queries from the input question and applying the queries to a corpus of documents. The QA system obtains a listing of candidate answers from the corpus of documents along with a corresponding confidence measure and returns the ranked listing of candidate answers and their confidence measures.

In addition, additional source information may be provided along with the candidate answers to indicate the source from which each candidate answer was obtained. Thus, in the depicted example, the input question "What is the gas revenue for 2007" may be submitted as an input question to the QA system, which will analyze the question and generate queries that are applied to a corpus and the resulting ranked listing of candidate answers is returned, e.g., a listing of a first candidate answer with "$254,340" as an answer with a "95%" confidence measure, a second candidate answer with "$360,432" as an answer with "45% confidence", and the like.

The candidate answers returned by the QA system are analyzed to identify which candidate answer is the most likely correct answer for replacing the erroneous value in the suspicious cell. For example, the highest ranked candidate answer may be selected as a potential replacement for the erroneous value and may be further analyzed to determine if this candidate answer should actually be used as a replacement and whether such replacement can be performed automatically with a threshold amount of certainty, or if a human user needs to provide authorization for the replacement. These determinations may be made by comparing the confidence measure against one or more confidence measure thresholds. For example, the confidence measure of the selected candidate answer may be compared against a first threshold that is indicative of a minimum level of confidence required to be considered a valid potential replacement for an erroneous value in a suspicious cell, e.g., 90% confidence threshold. The confidence measure may then be compared against a second threshold to determine if manual intervention by a human user is required to perform the replacement, e.g., a threshold of 95%. If the confidence measure meets or exceeds both criteria, then the replacement of the erroneous value with the candidate answer may be performed automatically. If the confidence measure meets the first threshold criteria but not the second, then a notification may be sent to a human user suggesting the replacement of the erroneous value with the candidate answer, specifying the measure of confidence, and optionally providing source identification information for consideration by the user. If the user selects to perform the replacement, then the replacement is performed by the system; otherwise if the user selects not to perform the replacement, an error notification may be presented to the user indicating that the document being processed contains an erroneous value that could not be corrected.

If the confidence measure does not meet either threshold criteria, then the selected candidate answer is not used as a replacement for the erroneous value. Other candidate answers in the ranked listing may be processed in a similar manner to determine if any other candidate answers meet the requirements. In addition, in cases where the first threshold criteria is met by a candidate answer but the second threshold criteria is not met, the system may analyze other candidate answers in the ranked list to determine if any other candidate answers in the ranked list meet both threshold criteria, in which case any candidate answers that meet both threshold criteria may be selected as the potential replacement for the erroneous value.

It should be appreciated that the use of two separate thresholds is just one example embodiment and other embodiments may utilize different mechanisms for determining if there is a sufficient level of confidence in a selected candidate answer being a valid replacement for an erroneous value, and determining whether such replacement is to be performed automatically or with human user intervention, without departing from the spirit and scope of the illustrative embodiments. For example, in another illustrative embodiment, a single minimum confidence measure threshold may be used to determine if the selected candidate answer is a valid replacement for the erroneous value, and a determination as to the degree by which the minimum confidence measure threshold is exceeded may be used as a basis for determining if the replacement can be performed automatically or with human user intervention, e.g., if the confidence measure exceeds the minimum confidence measure threshold by more than 10%, then the replacement can be performed automatically. Many other embodiments are possible in view of this description of the illustrative embodiments.

Again, it should be noted that while the illustrative embodiments described herein are directed to the correction of erroneous or missing values in cells of a table, the illustrative embodiments are not limited to such. Rather, any content of a document that is identifiable as suspicious of being erroneous or missing may be a basis for such correction. For example, erroneous or missing words in a sentence may be identified and the context surrounding the erroneous or missing words may be used as a basis for generating a natural language question or structured query that is applied to a knowledge base to determine an appropriate correction for the erroneous or missing word.

Thus, the mechanisms of the illustrative embodiments provide functionality and logic for identifying suspicious portions of content, e.g., cells in a table structure of a document, which have content that may need to be corrected or replaced, or may lack content that should be generated. The mechanisms of the illustrative embodiments obtain context information from the document and use this context information to generate a natural language question or structured query to be submitted to a knowledge base, e.g., corpus of documents via a QA system, database of documents, or the like. The results of processing the question/query on the knowledge base are returned and used as a basis for selecting a replacement content for the erroneous or missing content in the suspicious portion of content. The replacement is then performed either automatically or with human intervention based on a determined level of confidence in the replacement content.

Figure 9:
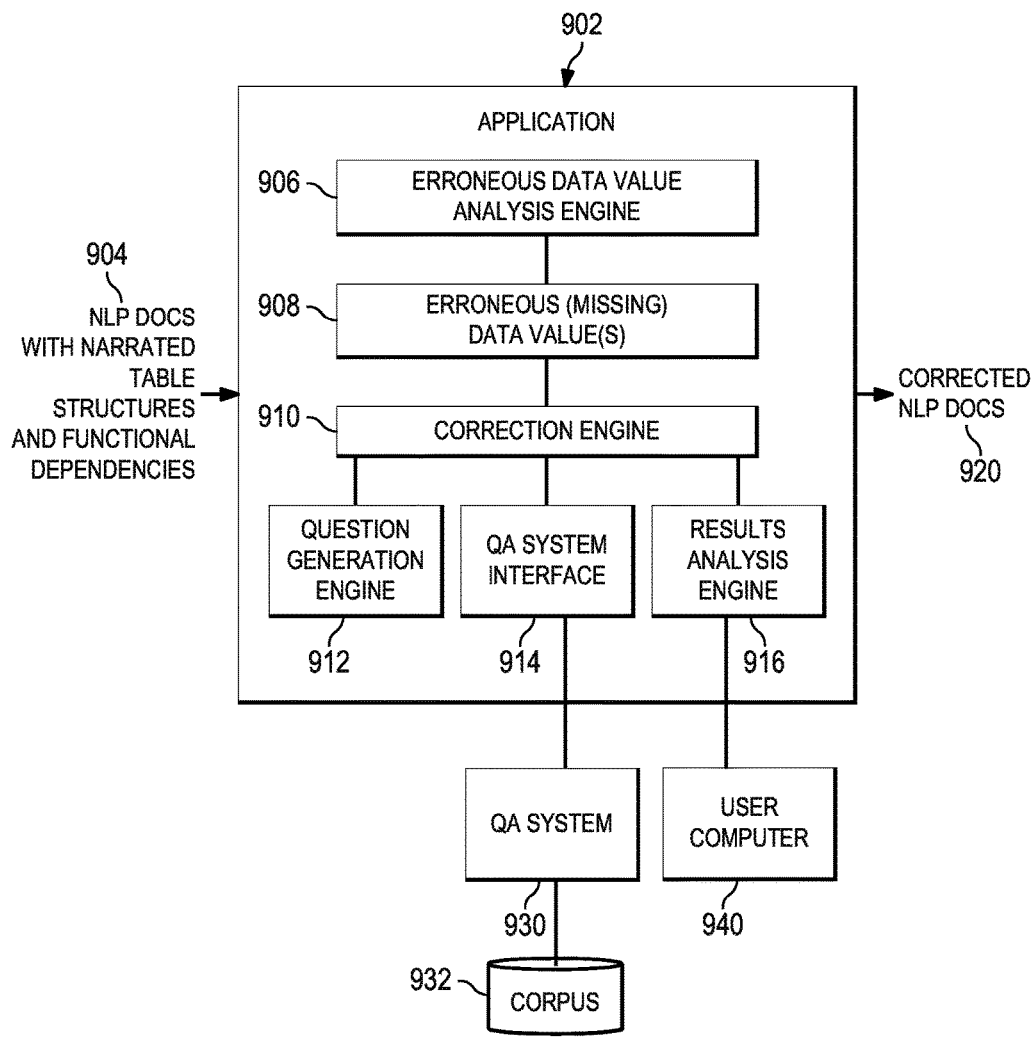
FIG. 9 is an example block diagram of an application for correcting erroneous or missing data values in cells of tabular data in a document in accordance with an illustrative embodiment.

FIG. 9 is an example block diagram of an application for correcting erroneous or missing data values in cells based upon discovered functional relationships in tabular data in accordance with an illustrative embodiment. It should be noted that the application 902 shown in FIG. 9 is illustrated as being for an embodiment that operates in conjunction with a QA system 930 operating on a corpus of documents 932. Other illustrative embodiments may include utilizing the application 902 with other types of knowledge bases, such as a database of documents or the like upon which a structured query may be applied.

The application 902 shown in FIG. 9 may receive input from the application shown and described above with reference to FIG. 5 or may be integrated with the application of FIG. 5 depending upon the particular desired embodiment. In either case, the application 902 of FIG. 9 can be used, along with application 502, in place of application 105 in FIG. 1. Application 902 receives as input 904 the natural language processed documents with the table structures and functional dependencies as output by application 502 (assuming that application 902 is separate from application 502). The table structures are then analyzed by the erroneous data value analysis engine 906 of the application 902 to identify erroneous data values based on one or more heuristics, identified functional dependency patterns, or the like, to identify erroneous data values 908 within the table structures 904.

The identification of erroneous data values 908 are input to the correction engine 910. The correction engine 910 controls the overall operation for correcting erroneous or missing data values 908 in the input document 904 using the various components 912-916. That is, the correction engine 910 invokes the question generation engine 912 to analyze the context of the document surrounding the erroneous or missing data values, including header information from the rows/columns, functional dependencies identified, and the like, to generate a semantic signature for the erroneous or missing data value. The question generation engine 912 may then convert the semantic signature to a natural language question that may be submitted to the QA system 930 via the QA system interface 914.

The QA system 930 receives the generated question from the application 902 via the QA system interface 914 as an input question for answering by the QA system 930. The QA system 930 performs its operations for processing input questions, as will be described in greater detail hereafter with reference to FIG. 10, to generate one or more queries that are applied against the corpus 932 of documents. The QA system 930, based on results of applying the one or more queries to the corpus 932, generates a ranked listing of one or more candidate answers to answer the input question. The candidate answers may be ranked according to confidence measures that are calculated for each of the candidate answers as part of the application of the one or more queries to the corpus 932. Each of the candidate answers in the ranked listing may have associated confidence measures and, optionally, source information to identify the source document, publication, author, organization, or other entity that is the source of the document or documents providing the candidate answer.

The ranked listing of candidate answers may be returned by the QA system 930 to the correction engine 910 via the QA system interface 914. The correction engine 910 then invokes the results analysis engine 916 to process the ranked listing of candidate answers to select a candidate answer as a potential replacement, or newly generated value, for the missing or erroneous data value 908. A candidate answer may be selected from the ranked listing based on the associated confidence measures, e.g., a candidate answer having a highest confidence measure. The selected candidate answers' confidence measure is then analyzed to determine if it is sufficient to be used as a replacement or new value for the missing or erroneous data value 908. In addition, the confidence measure is further analyzed to determine if it is sufficient to warrant automatic correction of the erroneous or missing data value 908 or if a human user is to be notified and requested to provide manual approval of the correction. As mentioned previously, such determinations may be made by comparing the confidence measures against one or more thresholds.

If it is determined that human intervention is necessary to obtain authorization to perform the replacement of the erroneous or missing data value 908, then a notification may be sent to a user at the user's computer 940. The notification may include the suggested replacement value, the measure of confidence associated with the suggested replacement value, and optionally source information indicating the source of the suggested replacement value. If the user responds with authorization to perform the replacement, the correction engine 910 may correct the erroneous or missing data value 908. If the user does not respond with authorization to perform the replacement, and error notification may be generated and output to the user so that the user may thereafter perform manual correction of the erroneous or missing data value 908 via the user computer 940. If it is determined that manual intervention by a user is not necessary, the correction engine 910 may perform the correction of the erroneous or missing data value 908 automatically without contacting the user via the user computer 940. The application 902 may then output the natural language processed documents 920 with the corrected data values in the table structures.

It should be appreciated that while the illustrative embodiments have been described above with regard to primarily numerical data values in cells of a table structure, the illustrative embodiments are not limited to such. To the contrary, as touched upon above, the illustrative embodiments may be utilized to identify functional dependencies of non-numeric data values and correct erroneous or missing non-numerical data values in a similar fashion as described above.

As described above, in some illustrative embodiments, the mechanisms of the illustrative embodiments operate in conjunction with a QA system. The QA system implements one or more QA system pipelines for processing input questions and generating candidate answers to the input questions. If multiple QA system pipelines are utilized, each pipeline may be trained and configured for operation with a particular domain of subject matter. In such a case, an initial analysis of the input question may be utilized to identify the domain of the input question so that routing of the question to an appropriate QA system pipeline may be performed.

Figure 10:
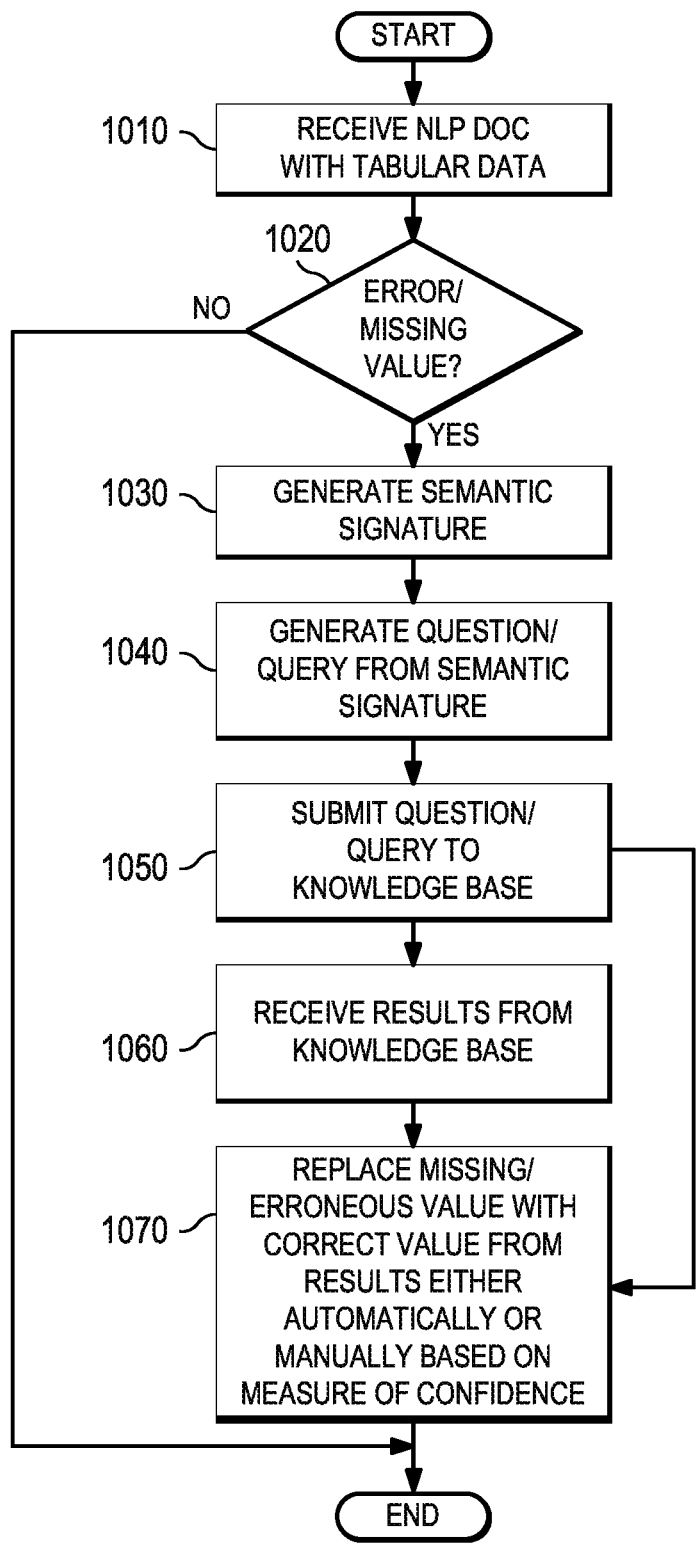
FIG. 10 is a flowchart outlining an example process for correcting erroneous or missing data values in cells of tabular data in accordance with one illustrative embodiment.

FIG. 10 illustrates a QA system pipeline for processing an input question in accordance with one illustrative embodiment. The QA system pipeline of FIG. 10 may be implemented, for example, as a QA system pipeline of QA system 930 in FIG. 9. It should be appreciated that the stages of the QA system pipeline shown in FIG. 10 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems.

As shown in FIG. 10, the QA system pipeline 1000 comprises a plurality of stages 1010-1080 through which the QA system operates to analyze an input question and generate a final response. In an initial question input stage 1010, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 1000, i.e. the question and topic analysis stage 1020, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 1030 to decompose the question into one or more queries that may be applied to the corpora of data/information 1045 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpus of data/information 1045. That is, these various sources themselves, collections of sources, and the like, may each represent different corpus 1047 within the corpora 1045. There may be a different corpus 1047 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 1047 within the corpora 1045.

The queries may be applied to one or more databases storing information about the electronic texts, documents, articles, websites, and the like, that make up the corpus of data/information, e.g., the corpus of data 932 in FIG. 9. The queries being applied to the corpus of data/information at the hypothesis generation stage 1040 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 1040, to generate hypotheses for answering the input question. These hypotheses are also referred to herein as "candidate answers" for the input question. For any input question, at this stage 1040, there may be hundreds of hypotheses or candidate answers generated that may need to be evaluated.

The QA system pipeline 1000, in stage 1050, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 1060, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter.

The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 1070 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question. In accordance with the illustrative embodiments, the ranked listing of candidate answers, or the final answer, may be returned to the application 902 in FIG. 9 for processing of the results to identify a replacement value for an erroneous or missing value, or portion of content, in a document being processed.

FIG. 10 is a flowchart outlining an example process for correcting erroneous or missing data values in cells based upon discovered functional relationships in tabular data in accordance with one illustrative embodiment. Again, FIG. 10 outlines an example process that is for correcting a cell in a table structure of an NLP document, however in other illustrative embodiments, these mechanisms may be used to correct any portion of content in a NLP document and is not limited to cells in tables or numerical values, as previously discussed above.

As shown in FIG. 10, the process starts by receiving a natural language processed document with table structure and functional dependencies identified according to hypotheses and confidence ratings (step 1010) as described in the processes outlined in FIGS. 6 and 7 above. The table structure is analyzed to determine if there are any erroneous or missing data values in cells of the table structure (step 1020). If not, the operation terminates.

Otherwise, if an erroneous or missing data value is found, a semantic signature for the erroneous or missing data value is generated (step 1030). A question/query is generated from the semantic signature (step 1040) and is submitted to a knowledge base, e.g., QA system, document database, or the like (step 1050) search the knowledge base for an answer to the question/query. The results of the application of the question/query to the knowledge base are received (step 1060) and the results are used as a basis to replace the missing or erroneous value with a correct value either automatically or manually based on measures of confidence returned in the results (step 1070). The operation then terminates.

Thus, the illustrative embodiments provide mechanisms for identifying functional dependencies between portions of table structures in documents being ingested by a natural language processing system. These functional dependencies are further utilized to identify erroneous or missing data values in these portions of table structures, or other portions of content in a document. Moreover, the illustrative embodiments utilize the context surrounding the identified erroneous or missing data values, or portions of content, to generate questions/queries that are submitted to a knowledge base to obtain corrected values or corrected portions of content. Based on measures of confidence associated with the corrected values or corrected portions of content, the erroneous or missing content may be automatically or semi-automatically (with human user manual approval) corrected. As a result, more complete table structures and other document content for natural language processed documents are generated that can be used to perform natural language processing operations, such as question and answer operations in a QA system, such as IBM's Watson™ QA system, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for performing tabular data correction in a document, the method comprising:

configuring the processor to implement a natural language processing (NLP) system that performs natural language processing on natural language content at least by processing logical relationships in the natural language content;

responsive to receiving a natural language document with table structures and functional dependencies identified therein:

configuring an erroneous data value analysis engine to analyze a portion of content within a natural language document to identify an erroneous sub-portion within the natural language document comprising an erroneous or missing item of information;

analyzing, by the erroneous data value analysis engine executed by the processor in the data processing system, a portion of content within a natural language document to identify an erroneous sub-portion within the natural language document comprising an erroneous or missing item of information, wherein the portion of content comprises a table data structure present in the natural language document, wherein the erroneous sub-portion comprises a cell in the table data structure having an erroneous or missing data value, wherein the erroneous sub-portion is identified based on the erroneous sub-portion failing to conform with a regular structure associated with the portion of content within the natural language document, and wherein the regular structure is a repeatable pattern within the portion of content within the natural language document;

configuring a question generation engine to generate a semantic signature for the erroneous sub-portion;

generating, by the question generation engine executed by the processor in the data processing system, the semantic signature for the erroneous sub-portion, wherein generating the semantic signature for the erroneous sub-portion comprises:

performing, by the question generation engine, a discovery of functional dependencies between the erroneous or missing data value in the cell of the table data structure and a second portion of content, wherein the functional dependencies are indicated by the repeatable pattern;

analyzing, by the question generation engine, context information surrounding the erroneous sub-portion of content in the natural language document utilizing the functional dependencies between the erroneous or missing data value in the cell of the table data structure and a second portion of content; and converting, by the question generation engine, the context information into a narrated statement using a narration mechanism;

configuring a Question and Answer (QA) system to generate a query based on the semantic signature and apply the query to a knowledge base to identify a candidate sub-portion of content for correcting the erroneous sub-portion;

generating, by the Question and Answer (QA) system executed by the processor in the data processing system, the query based on the semantic signature;

applying, by the QA system, the query to the knowledge base to identify the candidate sub-portion of content for correcting the erroneous sub-portion;

configuring a correction engine to correct the erroneous sub-portion to generate a corrected natural language document and store the corrected natural language document;

correcting, by the correction engine executed by the processor in the data processing system, the erroneous sub-portion using the identified candidate sub-portion of content to generate the corrected natural language document; and storing, by the correction engine, the corrected natural language document in a storage device.

2. The method of claim 1, wherein the second portion of content comprises at least one of a cell in another table data structure of the natural language document, a cell in another table data structure of another natural language document, or a portion of content in another natural language document.

3. The method of claim 1, wherein performing discovery of functional dependencies between the erroneous or missing data value in the cell of the table data structure and the second portion of content comprises identifying one or more mathematical, statistical, logical, or conditional functions that operate on the cell of the table data structure and that indicate a functional dependency of the cell on the second portion of content.

4. The method claim 1, wherein performing discovery of functional dependencies between the erroneous or missing data value in the cell of the table data structure and the second portion of content comprises identifying functional relationships between headers of cells in the table data structure.

5. The method of claim 1, wherein correcting the erroneous sub-portion using the identified candidate sub-portion of content to generate a corrected natural language document comprises sending a notification of a user identifying the erroneous or missing item of information to the user and requesting that the user confirm replacement of the erroneous sub-portion of content with the candidate sub-portion of content.

6. The method of claim 1, wherein the knowledge base is a corpus of natural language documents, and wherein the query is applied to the corpus by the QA system to identify the candidate sub-portion of content.

7. The method of claim 6, wherein:

the QA system returns a plurality of candidate answers to the query, identifying the candidate sub-portion of content comprises selecting, by the correction engine, a candidate answer from the plurality of candidate answers as the candidate sub-portion of content based on confidence measures for each of the plurality of candidate answers, and correcting, by the correction engine, the sub-portion using the identified candidate sub-portion of content to generate a corrected natural language document comprises:

configuring the correction engine to compare the confidence measure for the selected candidate answer to a threshold confidence measure;

comparing, by the correction engine, the confidence measure for the selected candidate answer to the threshold confidence measure;

configuring the correction engine to perform one of automatic correction of the erroneous sub-portion using the identified candidate sub-portion or sending a notification to a user indicating the erroneous sub-portion, the candidate sub-portion, and requesting authorization to perform the correction, based on results of comparing the confidence measure for the selected candidate answer to the threshold confidence measure; and performing, by the correction engine, one of the automatic correction of the erroneous sub-portion using the identified candidate sub-portion or sending the notification to the user indicating the erroneous sub-portion, the candidate sub-portion, and requesting authorization to perform the correction, based on the results of comparing the confidence measure for the selected candidate answer to the threshold confidence measure.

8. A computer program product comprising a non-transitory computer readable storage medium having a computer readable program for performing tabular data correction in a document stored therein, wherein the computer readable program, when executed on a computing device, causes the computing device to:

configure the computing device to implement a natural language processing (NLP) system that performs natural language processing on natural language content at least by processing logical relationships in the natural language content;
responsive to receiving a natural language document with table structures and functional dependencies identified therein:
configuring an erroneous data value analysis engine within the computing device to analyze a portion of content within a natural language document to identify an erroneous sub-portion within the natural language document comprising an erroneous or missing item of information;
analyze, by the erroneous data value analysis engine executed by a processor in the computing device, a portion of content within a natural language document to identify an erroneous sub-portion within the natural language document comprising an erroneous or missing item of information, wherein the portion of content comprises a table data structure present in the natural language document, wherein the erroneous sub-portion comprises a cell in the table data structure having an erroneous or missing data value, wherein the erroneous sub-portion is identified based on the erroneous sub-portion failing to conform with a regular structure associated with the portion of content within the natural language document, and wherein the regular structure is a repeatable pattern within the portion of content within the natural language document;
configure a question generation engine within the computing device to generate a semantic signature for the erroneous sub-portion;
generate, by the question generation engine executed by the processor in the computing device, the semantic signature for the erroneous sub-portion, wherein the computer readable program further causes the computing device to generate a semantic signature for the erroneous sub-portion at least by:
perform, by the question generation engine, a discovery of functional dependencies between the erroneous or missing data value in the cell of the table data structure and a second portion of content, wherein the functional dependencies are indicated by the repeatable pattern;
analyzing, by the question generation engine, context information surrounding the erroneous sub-portion of content in the natural language document; and
converting, by the question generation engine, the context information into a narrated statement using a narration mechanism;
configure a Question and Answer (OA) system within the computing device to generate a query based on the semantic signature and apply the query to a knowledge base to identify a candidate sub-portion of content for correcting the erroneous sub-portion;
generate, by the Question and Answer (QA) system executed by the processor in the computing device, the query based on the semantic signature;
apply, by the QA system, the query to the knowledge base to identify the candidate sub-portion of content for correcting the erroneous sub-portion;
configure a correction engine within the computing device to correct the erroneous sub-portion and store the corrected natural language document;
correct, by the correction engine executed by the processor in the computing device, the erroneous sub-portion using the identified candidate sub-portion of content to generate the corrected natural language document; and
store, by the correction engine, the corrected natural language document in a storage device.

9. The computer program product of claim 8, wherein the second portion of content comprises at least one of a cell in another table data structure of the natural language document, a cell in another table data structure of another natural language document, or a portion of content in another natural language document.

10. The computer program product claim 8, wherein the computer readable program further causes the computing device to perform discovery of functional dependencies between the erroneous or missing data value in the cell of the table data structure and the second portion of content at least by identifying functional relationships between headers of cells in the table data structure.

11. The computer program product of claim 8, wherein the computer readable program further causes the computing device to correct the erroneous sub-portion using the identified candidate sub-portion of content to generate a corrected natural language document at least by sending a notification of a user identifying the erroneous or missing item of information to the user and requesting that the user confirm replacement of the erroneous sub-portion of content with the candidate sub-portion of content.

12. The computer program product of claim 8, wherein the knowledge base is a corpus of natural language documents, and wherein the query is applied to the corpus by the QA system to identify the candidate sub-portion of content.

13. The computer program product of claim 12, wherein:
the QA system returns a plurality of candidate answers to the query,
identifying the candidate sub-portion of content comprises selecting, by the correction engine, a candidate answer from the plurality of candidate answers as the candidate sub-portion of content based on confidence measures for each of the plurality of candidate answers, and
correcting, by the correction engine, the sub-portion using the identified candidate sub-portion of content to generate a corrected natural language document comprises:
configuring the correction engine to compare the confidence measure for the selected candidate answer to a threshold confidence measure;
comparing, by the correction engine, the confidence measure for the selected candidate answer to the threshold confidence measure;
configuring the correction engine to perform one of automatic correction of the erroneous subportion using the identified candidate sub-portion or sending a notification to a user indicating the erroneous sub-portion, the candidate sub-portion, and requesting authorization to perform the correction, based on results of comparing the confidence measure for the selected candidate answer to the threshold confidence measure; and
performing, by the correction engine, one of the automatic correction of the erroneous sub-portion using the identified candidate sub-portion or sending the notification to the user indicating the erroneous sub-portion, the candidate sub-portion and requesting authorization to perform the correction, based on the results of comparing the confidence measure for the selected candidate answer to the threshold confidence measure.

14. An apparatus for performing tabular data correction in a document comprising:
a processor; and
a memory coupled to the processor, wherein the memory comprises instructions which, when executed by the processor, cause the processor to:
configure the processor to implement a natural language processing (NLP) system that performs natural language processing on natural language content at least by processing logical relationships in the natural language content;
responsive to receiving a natural language document with table structures and functional dependencies identified therein:
configuring an erroneous data value analysis engine to analyze a portion of content within a natural language document to identify an erroneous sub-portion within the natural language document comprising an erroneous or missing item of information;
analyze, by the erroneous data value analysis engine executed by a processor in the computing device, a portion of content within a natural language document to identify an erroneous sub-portion within the natural language document comprising an erroneous or missing item of information, wherein the portion of content comprises a table data structure present in the natural language document, wherein the erroneous sub-portion comprises a cell in the table data structure having an erroneous or missing data value, wherein the erroneous sub-portion is identified based on the erroneous sub-portion failing to conform with a regular structure associated with the portion of content within the natural language document, and wherein the regular structure is a repeatable pattern within the portion of content within the natural language document;
configure a question generation engine to generate a semantic signature for the erroneous sub-portion;
generate, by the question generation engine executed by the processor in the computing device, the semantic signature for the erroneous sub-portion, wherein the computer readable program further causes the computing device to generate a semantic signature for the erroneous sub-portion at least by;
perform, by the question generation engine, a discovery of functional dependencies between the erroneous or missing data value in the cell of the table data structure and a second portion of content, wherein the functional dependencies are indicated by the repeatable pattern;
analyzing, by the question generation engine, context information surrounding the erroneous sub-portion of content in the natural language document; and
converting, by the question generation engine, the context information into a narrated statement using a narration mechanism;
configure a Question and Answer (QA) system to generate a query based on the semantic signature and apply the query to a knowledge base to identify a candidate sub-portion of content for correcting the erroneous sub-portion;
generate, by the Question and Answer (QA) system executed by the processor in the computing device, the query based on the semantic signature;
apply, by the QA system, the query to the knowledge base to identify the candidate sub-portion of content for correcting the erroneous sub-portion;
configure a correction engine to correct the erroneous sub-portion and store the corrected natural language document;
correct, by the correction engine executed by the processor in the computing device, the erroneous sub-portion using the identified candidate sub-portion of content to generate the corrected natural language document; and
store, by the correction engine, the corrected natural language document in a storage device.

\* \* \* \* \*